United States Patent
Li et al.

(10) Patent No.: US 12,101,650 B2
(45) Date of Patent: Sep. 24, 2024

(54) COMMUNICATION METHOD AND COMMUNICATION APPARATUS

(71) Applicant: Huawei Technologies Co., Ltd., Shenzhen (CN)

(72) Inventors: Chao Li, Beijing (CN); Gen Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 323 days.

(21) Appl. No.: 17/721,120

(22) Filed: Apr. 14, 2022

(65) Prior Publication Data

US 2022/0248240 A1  Aug. 4, 2022

Related U.S. Application Data

(63) Continuation of application No. PCT/CN2019/111751, filed on Oct. 17, 2019.

(51) Int. Cl.
*H04W 24/02* (2009.01)
*H04W 72/04* (2023.01)
*H04W 72/044* (2023.01)
*H04W 92/18* (2009.01)

(52) U.S. Cl.
CPC ......... *H04W 24/02* (2013.01); *H04W 72/044* (2013.01); *H04W 92/18* (2013.01)

(58) Field of Classification Search
CPC ... H04W 24/02; H04W 92/18; H04W 72/044; H04W 72/20; H04W 72/042; H04W 72/0493; H04W 28/18; H04L 1/1877; H04L 1/1822

See application file for complete search history.

(56) References Cited

U.S. PATENT DOCUMENTS

| | | | |
|---|---|---|---|
| 11,330,596 B2* | 5/2022 | Lin | H04W 72/044 |
| 2018/0124656 A1 | 5/2018 | Park et al. | |
| 2019/0158993 A1 | 5/2019 | Kwon | |
| 2019/0222983 A1* | 7/2019 | Adachi | H04W 92/18 |
| 2019/0222985 A1 | 7/2019 | Nguyen et al. | |
| 2020/0328865 A1* | 10/2020 | Choi | H04W 4/06 |

FOREIGN PATENT DOCUMENTS

| | | |
|---|---|---|
| CN | 102158901 A | 8/2011 |
| CN | 105246025 A | 1/2016 |
| EP | 3139687 A1 | 3/2017 |
| WO | 2019013973 A1 | 1/2019 |

OTHER PUBLICATIONS

Intel Corporation et al., "UE Capabilities for LTE Rel. 15 V2X Communication," 3GPP TSG RAN WG1 Meeting #93, Busan, Korea, R1-1806486, May 21-25, 2018, 5 pages.

* cited by examiner

*Primary Examiner* — Rasheed Gidado
(74) *Attorney, Agent, or Firm* — Slater Matsil, LLP

(57) ABSTRACT

Embodiments provide a method and an apparatus including: A first terminal apparatus determines at least one of a reception capability parameter or a transmission capability parameter based on a first parameter, where the reception capability parameter includes a quantity of channels that can be received in a first time interval, the transmission capability parameter includes a maximum quantity of transmitted bits, and the first parameter is configured by a network device, where the first parameter includes one or more of the following: a maximum interval between slots of initial transmission and last retransmission, a subcarrier spacing, and a sub-band size.

20 Claims, 5 Drawing Sheets

COMMUNICATION METHOD AND COMMUNICATION APPARATUS

CROSS-REFERENCE TO RELATED APPLICATIONS

This application is a continuation of International Application No. PCT/CN2019/111751, filed on Oct. 17, 2019, the disclosure of which is hereby incorporated by reference in its entirety.

TECHNICAL FIELD

This application relates to the communication field, and more specifically, to a communication method and a communication apparatus in the communication field.

BACKGROUND

As a key technology of a future intelligent transportation system (ITS), the Internet of Vehicles has attracted more and more attention recently. A vehicle-to-everything (V2X) system is a key technology in the Internet of Vehicles. The V2X includes vehicle-to-vehicle (vehicle-to-vehicle, V2V), vehicle-to-infrastructure (V2I), and vehicle-to-pedestrian (V2P) direct communication, and vehicle-to-network (V2N) communication interaction. Uplinks and downlinks are used for V2N vehicle-to-network communication, but sidelinks (SL) are used for V2V/V2I/V2P data communication.

In the V2X system, for a terminal device, signals sent by many other terminal devices arrive at a receiver of the terminal device. In this case, ideally, the terminal device needs to demodulate all data packets that may arrive at the receiver of the terminal device. However, due to constraints of implementation complexity, a cost, and power consumption of the terminal device, the terminal device cannot ensure that all data packets that potentially arrive at the receiver are demodulated.

Therefore, a solution is urgently required, so that a quantity of missed data packets can be reduced as much as possible, and a loss caused by miss detection can be reduced.

SUMMARY

This application provides a communication method and apparatus, so that a first terminal apparatus can determine a corresponding reception capability value/transmission capability value based on a corresponding parameter value, to help properly control a loss caused by miss detection of a data packet, and help achieve an optimal balance point between a cost and detection performance of the terminal.

According to a first embodiment, a communication method is provided, where the method includes: A first terminal apparatus determines a reception capability parameter and/or a transmission capability parameter based on a first parameter, where the reception capability parameter includes a quantity of channels that can be received in a first time interval, and/or a maximum quantity of received bits, the transmission capability parameter includes a maximum quantity of transmitted bits, and the first parameter is preconfigured, or the first parameter is configured by a network device, where the first parameter is used for sidelink transmission, and the first parameter includes one or more of the following: a maximum interval between slots of initial transmission and last retransmission, a subcarrier spacing, and a sub-band size. The first terminal apparatus performs sidelink transmission based on the reception capability parameter and/or the transmission capability parameter.

The first terminal apparatus may be a communication device or a communication apparatus that can support the communication device in implementing a function required by the method, for example, a chip system or a communication module in the communication device. For example, the communication device may be a terminal device or a network device.

In this embodiment of this application, the first terminal apparatus can determine the reception capability parameter based on at least one of the maximum interval between the slots of initial transmission and last retransmission, the subcarrier spacing, and the sub-band size, so that the first terminal apparatus can determine a corresponding reception capability value based on a corresponding parameter value. In this way, when signals sent by many other terminal devices arrive at a receiver of the first terminal apparatus, the first terminal apparatus can demodulate all data packets that may arrive at the receiver of the terminal device, to help reduce, as much as possible, a loss caused because some undetected data packets are missed due to an improper limitation, and help achieve an optimal balance point between a cost and performance of the terminal.

In addition/alternatively, in this embodiment of this application, the first terminal apparatus can determine the transmission capability parameter based on at least one of the maximum interval between the slots of initial transmission and last retransmission, the subcarrier spacing, and the sub-band size, so that the first terminal apparatus can determine a corresponding transmission capability value based on a corresponding parameter value. In this way, when a large quantity of data packets are to be sent and signals sent by many other terminal devices arrive at a receiver of the first terminal apparatus, the first terminal apparatus can properly determine a quantity of transmission data packets and a size of the data packet, to help reduce, as much as possible, a quantity of to-be-sent data packets discarded due to an improper transmission buffer size.

In some embodiments, the quantity of channels that can be received in the first time interval may be further understood as a quantity of reception users in the first time interval.

In some embodiments, the channel that can be received in the first time interval is, for example, a physical sidelink control channel (PSCCH).

In some embodiments, the reception capability parameter may further include a quantity of channels that can be received in the first time interval and a quantity (which may also be referred to as a quantity that is of RBs and that corresponds to the quantity of channels that can be received in the first time interval) that is of resource blocks (RB) that can be detected and that corresponds to the quantity of channels.

With reference to the first embodiment, in some implementations of the first embodiment, the quantity of channels that can be received in the first time interval includes:
  a quantity of control channels that can be received in the first time interval and/or a quantity of data channels that can be received in the first time interval; or a quantity of first-level control channels that can be received in the first time interval and/or a quantity of second-level control channels that can be received in the first time interval.

With reference to the first embodiment, in some implementations of the first embodiment, the reception capability parameter further includes:

a quantity that is of RBs that can be detected and that corresponds to the quantity of control channels that can be received in the first time interval, and/or a quantity that is of RBs that can be detected and that corresponds to the quantity of data channels that can be received in the first time interval; or a quantity that is of RBs that can be detected and that corresponds to the quantity of first-level control channels that can be received in the first time interval, and/or a quantity that is of RBs that can be detected and that corresponds to the quantity of second-level control channels that can be received in the first time interval.

Therefore, in this embodiment of this application, the first terminal apparatus can determine, based on at least one of the maximum interval between the slots of initial transmission and last retransmission, the subcarrier spacing, and the sub-band size, the quantity of channels that can be received in the first time interval and the quantity that is of RBs and that corresponds to the quantity of channels. In this way, when signals sent by many other terminal devices arrive at the receiver of the first terminal apparatus, the first terminal apparatus can demodulate all data packets that may arrive at the receiver of the terminal device, to help reduce, as much as possible, a loss caused because some undetected data packets are missed due to an improper limitation, and help achieve an optimal balance point between a cost and performance of the terminal.

With reference to the first embodiment, in some implementations of the first embodiment, the first time interval is one slot or is less than or equal to an interval between initial transmission and last retransmission of one data packet.

With reference to the first embodiment, in some implementations of the first embodiment, the initial transmission and the retransmission are initial transmission and retransmission that are based on blind retransmission, or the initial transmission and the retransmission are initial transmission and retransmission that are based on a hybrid automatic repeat request HARQ.

Therefore, in this embodiment of this application, in a communication system that supports blind retransmission or HARQ-based retransmission, the reception capability parameter and/or the transmission capability parameter can be determined based on the first parameter, to help properly control a loss caused by miss detection of a data packet, and help achieve an optimal balance point between a cost and detection performance of the terminal.

With reference to the first embodiment, in some implementations of the first embodiment, the quantity of channels is less than or equal to a product of a quantity of channels received in each slot in the first time interval and a quantity of slots in the first time interval. Therefore, a value range of the quantity of channels that can be received in the first time interval may be determined based on the quantity of channels that can be received in each slot in the first time interval and the quantity of slots in the first time interval.

In some possible implementations, the maximum quantity of received bits includes at least one of the following:

a maximum quantity of data channel transport block bits received in a slot, a maximum quantity of bits of a data channel transport block received in a slot, and a total maximum quantity of received bits, namely, a maximum quantity that is of received bits and that can be supported by the terminal device.

In some possible implementations, the maximum quantity of transmitted bits includes at least one of the following:

a maximum quantity of data channel transport block bits transmitted in a slot, a maximum quantity of bits of a data channel transport block transmitted in a slot, and a total maximum quantity of transmitted bits, namely, a maximum quantity that is of transmitted bits and that can be supported by the terminal device.

With reference to the first embodiment, in some implementations of the first embodiment, the quantity of channels that can be received in the first time interval belongs to at least one type of quantity of channels that can be received in the first time interval; and the subcarrier spacing belongs to at least one type of subcarrier spacing, where the at least one type of quantity of channels that can be received in the first time interval is in a one-to-one correspondence with the at least one type of subcarrier spacing, and a larger subcarrier spacing indicates a smaller quantity that is of channels that can be received in the first time interval and that corresponds to the subcarrier spacing; and/or the interval between the slots of initial transmission and last retransmission belongs to at least one type of interval between the slots of initial transmission and last retransmission, where the at least one type of quantity of channels that can be received in the first time interval is in a one-to-one correspondence with the at least one type of interval between the slots of initial transmission and last retransmission, and a larger interval between the slots of initial transmission and last retransmission indicates a larger quantity that is of channels that can be received in the first time interval and that corresponds to the interval between the slots of initial transmission and last retransmission; and/or the sub-band size belongs to at least one type of sub-band size, where the at least one type of quantity of channels that can be received in the first time interval is in a one-to-one correspondence with the at least one type of sub-band size, and a larger sub-band size indicates a smaller quantity that is of channels that can be received in the first time interval and that corresponds to the sub-band size.

Therefore, in this embodiment of this application, the first terminal apparatus, namely, a receive-end device, may determine, in a predefined manner (for example, a table) based on a capability type supported by the first terminal apparatus and at least one of a value of the SCS, the interval between the slots of initial transmission and last retransmission, and the sub-band size, the quantity that is of channels that can be received in the first time interval and that is supported by the first terminal apparatus, so that the receive-end device determines, based on the first parameter, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

With reference to the first embodiment, in some implementations of the first embodiment, the maximum quantity of received bits belongs to at least one type of maximum quantity of received bits; and the subcarrier spacing belongs to at least one type of subcarrier spacing, where the at least one type of maximum quantity of received bits is in a one-to-one correspondence with the at least one type of subcarrier spacing, and a larger subcarrier spacing indicates a smaller maximum quantity that is of received bits and that corresponds to the subcarrier spacing; and/or the maximum interval between the slots of initial transmission and last retransmission belongs to at least one type of maximum interval between the slots of initial transmission and last retransmission, where the at least one type of maximum quantity of received bits is in a one-to-one correspondence with the at least one type of maximum interval between the slots of initial transmission and last retransmission, and a larger maximum interval between the slots of initial transmission and last retransmission indicates a larger maximum quantity that is of received bits and that corresponds to the maximum interval between the slots of initial transmission and last retransmission; and/or the sub-band size belongs to at least one type of sub-band size, where the at least one type of maximum quantity of received bits is in a one-to-one correspondence with the at least one type of sub-band size, and a larger sub-band size indicates a smaller maximum quantity that is of received bits and that corresponds to the sub-band size.

Therefore, in this embodiment of this application, the first terminal apparatus, namely, a receive-end device, may determine the maximum quantity of received bits of the first terminal apparatus in a predefined manner (for example, a table) based on a capability type supported by the first terminal apparatus and at least one of a value of the SCS, the interval between the slots of initial transmission and last retransmission, and the sub-band size, so that the receive-end device determines, based on the first parameter, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

With reference to the first embodiment, in some implementations of the first embodiment, the maximum quantity of transmitted bits belongs to at least one type of maximum quantity of transmitted bits; and the subcarrier spacing belongs to at least one type of subcarrier spacing, where the at least one type of maximum quantity of transmitted bits is in a one-to-one correspondence with the at least one type of subcarrier spacing, and a larger subcarrier spacing indicates a smaller maximum quantity that is of transmitted bits and that corresponds to the subcarrier spacing; and/or the maximum interval between the slots of initial transmission and last retransmission belongs to at least one type of maximum interval between the slots of initial transmission and last retransmission, where the at least one type of maximum quantity of transmitted bits is in a one-to-one correspondence with the at least one type of maximum interval between the slots of initial transmission and last retransmission, and a larger maximum interval between the slots of initial transmission and last retransmission indicates a larger maximum quantity that is of transmitted bits and that corresponds to the maximum interval between the slots of initial transmission and last retransmission; and/or the sub-band size belongs to at least one type of sub-band size, where the at least one type of maximum quantity of transmitted bits is in a one-to-one correspondence with the at least one type of sub-band size, and a larger sub-band size indicates a smaller maximum quantity that is of transmitted bits and that corresponds to the sub-band size.

Therefore, in this embodiment of this application, the first terminal apparatus, namely, a transmit-end device, may determine, in a predefined manner (for example, a table) based on a capability type supported by the first terminal apparatus and at least one of a value of the SCS, the interval between the slots of initial transmission and last retransmission, and the sub-band size, the maximum quantity that is of transmitted bits and that is supported by the first terminal apparatus, so that the receive-end device determines, based on the first parameter, a transmission capability value (namely, the maximum quantity of transmitted bits) corresponding to a corresponding transmission capability of the receive-end device. In this way, when producing a corresponding device, an equipment vendor can design a corresponding architecture, calculation capability, power consumption, and device cost based on the transmission capability value, to achieve a good balance between a cost and performance based on a corresponding capability.

With reference to the first embodiment, in some implementations of the first embodiment, the first parameter further includes one or more of the following:

a reception type class, a bandwidth size, a carrier quantity or a carrier combination, and a spatial layer quantity.

With reference to the first embodiment, in some implementations of the first embodiment, the quantity of channels that can be received in the first time interval belongs to at least one type of quantity of channels that can be received in the first time interval; and the reception type class belongs to at least one type of reception type class, where the at least one type of quantity of channels that can be received in the first time interval is in a one-to-one correspondence with the at least one type of reception type class, and a higher reception type class indicates a larger quantity that is of channels that can be received in the first time interval and that corresponds to the reception type class; and/or the bandwidth size belongs to at least one type of bandwidth size, where the at least one type of quantity of channels that can be received in the first time interval is in a one-to-one correspondence with the at least one type of bandwidth size, and a larger bandwidth size indicates a larger quantity that is of channels that can be received in the first time interval and that corresponds to the bandwidth size; and/or the carrier quantity belongs to at least one type of carrier quantity, where the at least one type of quantity of channels that can be received in the first time interval is in a one-to-one correspondence with the at least one type of carrier quantity, and a larger carrier quantity indicates a larger quantity that is of channels that can be received in the first time interval and that corresponds to the carrier quantity; and/or the carrier combination belongs to at least one type of carrier combination, where the at least one type of quantity of channels that can be received in the first time interval is in a one-to-one correspondence with the at least one type of carrier combination, and a larger total bandwidth of the carrier combination indicates a larger quantity that is of channels that can be received in the first time interval and that corresponds to the carrier combination; and/or the spatial layer quantity belongs to at least one type of spatial layer quantity, where the at least one type of quantity of channels that can be received in the first time interval is in a one-to-one correspondence with the at least one type of spatial layer quantity, and a larger spatial layer quantity indicates a larger quantity that is of channels that can be received in the first time interval and that corresponds to the spatial layer quantity.

Therefore, in this embodiment of this application, the first terminal apparatus, namely, a receive-end device, may determine, in a predefined manner (for example, a table) based on a capability type supported by the first terminal apparatus and at least one of the reception type class, the bandwidth size, the carrier quantity or the carrier combination, and the spatial layer quantity, the quantity that is of channels that can be received in the first time interval and that is supported by the first terminal apparatus, so that the receive-end device determines, based on the first parameter, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

With reference to the first embodiment, in some implementations of the first embodiment, the maximum quantity of received bits belongs to at least one type of maximum quantity of received bits; and the reception type class belongs to at least one type of reception type class, where the at least one type of maximum quantity of received bits is in a one-to-one correspondence with the at least one type of reception type class, and a higher reception type class indicates a larger maximum quantity that is of received bits and that corresponds to the reception type class; and/or the bandwidth size belongs to at least one type of bandwidth size, where the at least one type of maximum quantity of received bits is in a one-to-one correspondence with the at least one type of bandwidth size, and a larger bandwidth size indicates a larger maximum quantity that is of received bits that can be received in the first time interval and that corresponds to the bandwidth size; and/or the carrier quantity belongs to at least one type of carrier quantity, where the at least one type of maximum quantity of received bits is in a one-to-one correspondence with the at least one type of carrier quantity, and a larger carrier quantity indicates a larger maximum quantity that is of received bits and that corresponds to the carrier quantity; and/or the carrier combination belongs to at least one type of carrier combination, where the at least one type of maximum quantity of received bits is in a one-to-one correspondence with the at least one type of carrier combination, and a larger total bandwidth of the carrier combination indicates a larger maximum quantity that is of received bits and that corresponds to the carrier combination; and/or the spatial layer quantity belongs to at least one type of spatial layer quantity, where the at least one type of maximum quantity of received bits is in a one-to-one correspondence with the at least one type of spatial layer quantity, and a larger spatial layer quantity indicates a larger maximum quantity that is of received bits and that corresponds to the spatial layer quantity.

Therefore, in this embodiment of this application, the first terminal apparatus, namely, a receive-end device, may determine the maximum quantity of received bits of the first terminal apparatus in a predefined manner (for example, a table) based on a capability type supported by the first terminal apparatus and at least one of the reception type class, the bandwidth size, the carrier quantity or the carrier combination, and the spatial layer quantity, so that the receive-end device determines, based on the first parameter, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

With reference to the first embodiment, in some implementations of the first embodiment, the maximum quantity of transmitted bits belongs to at least one type of maximum quantity of transmitted bits; and the transmission type class belongs to at least one type of transmission type class, where the at least one type of maximum quantity of transmitted bits is in a one-to-one correspondence with the at least one type of transmission type class, and a higher transmission type class indicates a larger maximum quantity that is of transmitted bits and that corresponds to the transmission type class; and/or the bandwidth size belongs to at least one type of bandwidth size, where the at least one type of maximum quantity of transmitted bits is in a one-to-one correspondence with the at least one type of bandwidth size, and a larger bandwidth size indicates a larger maximum quantity that is of transmitted bits and that corresponds to the bandwidth size; and/or the carrier quantity belongs to at least one type of carrier quantity, where the at least one type of maximum quantity of transmitted bits is in a one-to-one correspondence with the at least one type of carrier quantity, and a larger carrier quantity indicates a larger maximum quantity that is of transmitted bits and that corresponds to the carrier quantity; and/or the carrier combination belongs to at least one type of carrier combination, where the at least one type of maximum quantity of transmitted bits is in a one-to-one correspondence with the at least one type of carrier combination, and a larger total bandwidth of the carrier combination indicates a larger maximum quantity that is of transmitted bits and that corresponds to the carrier combination; and/or the spatial layer quantity belongs to at least one type of spatial layer quantity, where the at least one type of maximum quantity of transmitted bits is in a one-to-one correspondence with the at least one type of spatial layer quantity, and a larger spatial layer quantity indicates a larger maximum quantity that is of transmitted bits and that corresponds to the spatial layer quantity.

Therefore, in this embodiment of this application, the first terminal apparatus, namely, a transmit-end device, may determine, in a predefined manner (for example, a table) based on a capability type supported by the first terminal apparatus and at least one of the reception type class, the bandwidth size, the carrier quantity or the carrier combination, and the spatial layer quantity, the maximum quantity that is of transmitted bits and that is supported by the first terminal apparatus, so that the receive-end device determines, based on the first parameter, a transmission capability value (namely, the maximum quantity of transmitted bits)

corresponding to a corresponding transmission capability of the receive-end device. In this way, when producing a corresponding device, an equipment vendor can design a corresponding architecture, calculation capability, power consumption, and device cost based on the transmission capability value, to achieve a good balance between a cost and performance based on a corresponding capability.

With reference to the first embodiment, in some implementations of the first embodiment, that a first terminal apparatus determines a reception capability parameter and/or a transmission capability parameter based on a first parameter includes:

The first terminal apparatus determines the quantity of channels based on the first parameter and/or one or more of the following parameters:

a demodulation reference signal pattern; and the maximum quantity of received bits.

With reference to the first embodiment, in some implementations of the first embodiment, the quantity of channels that can be received in the first time interval belongs to at least one type of quantity of channels that can be received in the first time interval; and the demodulation reference signal pattern belongs to at least one type of demodulation reference signal pattern, where the at least one type of quantity of channels that can be received in the first time interval is in a one-to-one correspondence with the at least one type of demodulation reference signal pattern, and when the demodulation reference signal pattern is a pattern that occupies a larger quantity of symbols, the quantity that is of channels that can be received in the first time interval and that corresponds to the demodulation reference signal pattern is smaller; and/or the maximum quantity of received bits belongs to at least one type of maximum quantity of received bits, where the at least one type of quantity of channels that can be received in the first time interval is in a one-to-one correspondence with the at least one type of maximum quantity of received bits, and a larger maximum quantity of received bits indicates a larger quantity that is of channels that can be received in the first time interval and that corresponds to the maximum quantity of received bits.

Therefore, in this embodiment of this application, the first terminal apparatus, namely, a receive-end device, may determine, in a predefined manner (for example, a table) based on a capability type supported by the first terminal apparatus and at least one of the demodulation reference signal pattern and the maximum quantity of received bits, the quantity that is of channels that can be received in the first time interval and that is supported by the first terminal apparatus, so that the receive-end device determines, based on the first parameter, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

With reference to the first embodiment, in some implementations of the first embodiment, that a first terminal apparatus determines a reception capability parameter based on a first parameter includes:

The first terminal apparatus determines the maximum quantity of received bits based on the first parameter and/or a modulation scheme.

With reference to the first embodiment, in some implementations of the first embodiment, the maximum quantity of received bits belongs to at least one type of maximum quantity of received bits; and the modulation scheme belongs to at least one type of modulation scheme, where the at least one type of modulation scheme is in a one-to-one correspondence with the at least one type of maximum quantity of received bits, and a higher modulation scheme indicates a larger maximum quantity that is of received bits and that corresponds to the modulation scheme.

Therefore, in this embodiment of this application, the first terminal apparatus, namely, a receive-end device, may determine the maximum quantity of received bits of the first terminal apparatus in a predefined manner (for example, a table) based on a capability type supported by the first terminal apparatus and at least one of the first parameter and the modulation scheme, so that the receive-end device determines, based on the first parameter and/or the modulation scheme, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

With reference to the first embodiment, in some implementations of the first embodiment, that a first terminal apparatus determines a reception capability parameter based on a first parameter includes:

The first terminal apparatus determines the maximum quantity of transmitted bits based on the first parameter and/or a modulation scheme.

With reference to the first embodiment, in some implementations of the first embodiment, the maximum quantity of transmitted bits belongs to at least one type of maximum quantity of transmitted bits; and the modulation scheme belongs to at least one type of modulation scheme, where the at least one type of modulation scheme is in a one-to-one correspondence with the at least one type of maximum quantity of transmitted bits, and a higher modulation scheme indicates a larger maximum quantity that is of transmitted bits and that corresponds to the modulation scheme.

Therefore, in this embodiment of this application, the first terminal apparatus, namely, a transmit-end device, may determine the maximum quantity of transmitted bits of the first terminal apparatus in a predefined manner (for example, a table) based on a capability type supported by the first terminal apparatus and at least one of the first parameter and the modulation scheme, so that the receive-end device determines, based on the first parameter and/or the modulation scheme, a transmission capability value (namely, the maximum quantity of transmitted bits) corresponding to a corresponding transmission capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

With reference to the first embodiment, in some implementations of the first embodiment, the method further includes:

When a buffer of the first terminal apparatus is full and/or when a quantity of channels received by the first terminal apparatus reaches a maximum value, the first terminal apparatus performs any one of the following processing:

the first terminal apparatus discards a process that is indicated in control information in received data and whose priority is lower than a preset priority, or data corresponding to the control information;

the first terminal apparatus discards a process or data whose distance to the first terminal apparatus is greater than a preset distance or exceeds a minimum communication distance required by a corresponding data packet;

the first terminal apparatus discards a to-be-received process or to-be-received data that is blindly transmitted;

the first terminal apparatus discards a to-be-received synchronization signal, where therefore, in this embodiment of this application, when data corresponding to a quantity of channels received by the first terminal apparatus in the first time interval is greater than a maximum buffer of the first terminal apparatus, a specified type of data or some types of data may be discarded according to the foregoing rule, so that a system performance loss can be reduced;

when to-be-transmitted data is transmitted in a HARQ manner, the first terminal apparatus discards data whose quantity of retransmission times exceeds a preset quantity of times, or when to-be-received data is transmitted in a HARQ manner, the first terminal apparatus discards data whose quantity of retransmission times exceeds a preset quantity of times; and the first terminal apparatus determines, based on a transmission type, to discard to-be-received data, where the transmission type includes unicast, multicast, or broadcast.

When a buffer of the first terminal apparatus is full and/or when a quantity of transmission users of the first terminal apparatus reaches a maximum quantity of users, the first terminal apparatus performs any one of the following processing:

the first terminal apparatus discards data that is in to-be-sent data and whose priority is lower than a preset priority;

the first terminal apparatus discards a process or data whose distance to the first terminal apparatus is greater than a preset distance or exceeds a minimum communication distance required by a corresponding data packet;

the first terminal apparatus discards a to-be-sent process or data that is blindly transmitted;

the first terminal apparatus discards a to-be-sent synchronization signal;

when to-be-transmitted data is transmitted in a HARQ manner, the first terminal apparatus discards data whose quantity of retransmission times exceeds a preset quantity of times, or when to-be-received data is transmitted in a HARQ manner, the first terminal apparatus discards data whose quantity of retransmission times exceeds a preset quantity of times; and the first terminal apparatus determines, based on a transmission type, to discard to-be-sent data, where the transmission type includes unicast, multicast, or broadcast.

Therefore, in this embodiment of this application, when data corresponding to a quantity of channels sent by the first terminal apparatus in the first time interval is greater than a maximum buffer of the first terminal apparatus, a specified type of data or some types of data may be discarded according to the foregoing rule, so that a system performance loss can be reduced.

With reference to the first embodiment, in some implementations of the first embodiment, the method further includes:

the first terminal apparatus sends first indication information to a second terminal apparatus, where the first indication information is used to indicate a reception capability parameter and/or a transmission capability parameter.

In this embodiment of this application, the reception capability parameter and/or the transmission capability parameter are/is sent to the second terminal apparatus, so that the first terminal apparatus and the second terminal apparatus can communicate with each other based on a transmission capability parameter and/or a reception capability parameter of a peer device, and the first terminal apparatus and the second terminal apparatus communicate with each other within a corresponding reception capability and/or transmission capability. This helps prevent data from being lost because the reception capability and/or the transmission capability do/does not match during data transmission.

According to a second embodiment, a communication apparatus is provided, where the communication apparatus includes a processor, configured to implement the method performed by the first communication apparatus in the first embodiment. The communication apparatus may further include a memory, configured to store program instructions and data. The memory is coupled to the processor, and the processor may invoke and execute the program instructions stored in the memory, to implement any method performed by the first terminal apparatus in the first embodiment. The communication apparatus may further include a transceiver, where the transceiver is configured to implement communication between the communication apparatus and another device.

According to a third embodiment, an embodiment of this application provides a communication apparatus, including: a processing unit, configured to determine a reception capability parameter and/or a transmission capability parameter based on a first parameter, where the reception capability parameter includes a quantity of channels that can be received in a first time interval, and/or a maximum quantity of received bits, the transmission capability parameter includes a maximum quantity of transmitted bits, and the first parameter is preconfigured, or the first parameter is configured by a network device, where the first parameter is used for sidelink transmission, and the first parameter includes one or more of the following: a maximum interval between slots of initial transmission and last retransmission, a subcarrier spacing, and a sub-band size; and a transceiver unit, configured to perform sidelink transmission under control of the processing unit based on the reception capability parameter and/or the transmission capability parameter.

In addition, the communication apparatus provided in the third embodiment may be configured to perform the method corresponding to the first device in the first embodiment. For an implementation that is not described in detail in the communication apparatus provided in the third embodiment, refer to the foregoing embodiment. Details are not described herein again.

According to a fourth embodiment, a computer program product is provided, where the computer program product includes computer program code, and when the computer program code is run on a computer, the computer is enabled to perform the method performed by the first terminal apparatus in the foregoing embodiments.

According to a fifth embodiment, this application provides a chip system, where the chip system includes a processor, configured to implement a function of the first terminal apparatus in the method in the foregoing embodiments, for example, receive or process data and/or information in the foregoing method. In a possible design, the chip system further includes a memory, configured to store program instructions and/or data. The chip system may include a chip, or may include a chip and another discrete component.

According to a sixth embodiment, this application provides a computer-readable storage medium, where the computer-readable storage medium stores a computer program, and when the computer program is run, the method performed by the first terminal apparatus in the foregoing embodiments is implemented.

For beneficial effects of the second embodiment to the sixth embodiment and the implementations of the second embodiment to the sixth embodiment, refer to descriptions of beneficial effects of the method and the implementations of the first embodiment.

DETAILED DESCRIPTION OF ILLUSTRATIVE EMBODIMENTS

Figure 1:
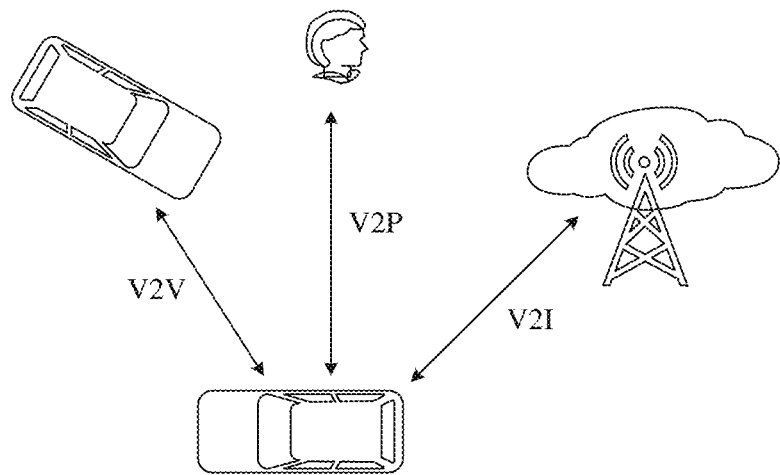
FIG. 1 is a schematic diagram of V2X according to an embodiment of this application.

The following describes technical solutions in this application with reference to the accompanying drawings.

Before this application is described, some terms of the embodiments of this application are first briefly explained and described, to help a person skilled in the art have a better understanding.

A terminal device includes a device that provides a user with voice and/or data connectivity, for example, may include a handheld device with a wireless connection function or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) communication terminal device, a V2X terminal device, a machine-to-machine/machine-type communication (M2M/MTC) terminal device, an Internet of Things (IoT) terminal device, a subscriber unit, a subscriber station, a mobile station, a remote station, an access point, a remote terminal, an access terminal, a user terminal, a user agent, an aircraft (such as a drone, a hot air balloon, or a civil aviation passenger aircraft), a user device, or the like. For example, the terminal device may include a mobile phone (or referred to as a "cellular" phone), a computer with a mobile terminal device, or a portable, pocket-sized, handheld, or computer built-in mobile apparatus, for example, a device such as a personal communication service (PCS) phone, a cordless telephone set, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example and not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus only on a type of application function and need to work with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU). The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement a method in this application.

A network device includes, for example, an access network (aAN) device such as a base station (for example, an access point), and may be a device that communicates with a wireless terminal device over an air interface through one or more cells in an access network. Alternatively, for example, a network device in a V2X technology is a road side unit (RSU). The base station may be configured to mutually convert a received over-the-air frame and an internet protocol (IP) packet, and serve as a router between the terminal device and other parts of the access network, where the other parts of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (eNB, or e-NodeB, evolutional Node B) in a long term evolution (LTE) system or a long term evolution-advanced (LTE-A) system, may include a next generation node B (gNB) in a 5G NR system, or may include a centralized unit (CU) and a distributed unit (DU) in a cloud radio access network (Cloud RAN) system. This is not limited in the embodiments of this application.

V2X is a key technology of a future intelligent transportation system. It implements communication between a vehicle and a vehicle, between a vehicle and a base station, and between a base station and a base station. In this way, a series of traffic information such as a real-time road condition, road information, and pedestrian information can be obtained. This improves driving safety, reduces congestion, improves traffic efficiency, provides in-vehicle infotainment information, and the like.

In the release (Rel)-14/15/16, as a major application of a device-to-device (D2D) technology, V2X is successfully approved. On a basis of an existing D2D technology, a specific application requirement of the V2X is to be optimized in the V2X, to further reduce an access delay of a V2X device and resolve a resource conflict problem.

V2X specifically further includes several application requirements such as vehicle-to-vehicle (V2V), vehicle-to-infrastructure (V2I), and vehicle-to-pedestrian (V2P) direct communication, and vehicle-to-network (V2N) communication interaction, as shown in FIG. 1. V2V refers to communication between vehicles. V2P refers to communication between a vehicle and a person (including a pedestrian, a bicycle rider, a driver, or a passenger). V2I refers to communication between a vehicle and a network device such as an RSU. In addition, V2N may be included in V2I. V2N refers to communication between a vehicle and a base station/a network.

The RSU includes two types: a terminal-type RSU and a base station-type RSU. Because the terminal-type RSU is deployed on a road side, the terminal-type RSU is in a non-mobile state, and mobility does not need to be considered. The base station-type RSU can provide timing synchronization and resource scheduling for a vehicle that communicates with the base station-type RSU.

The terms "system" and "network" may be used interchangeably in the embodiments of this application. "A plurality of" means two or more. In view of this, "a plurality of" may also be understood as "at least two" in the embodiments of this application. "At least one" may be understood as one or more, for example, one, two, or more. For example, "include at least one" means "include one, two, or more", and there is no limitation on which is included. For example, "include at least one of A, B, and C" may mean "include A, B, or C", "include A and B", "include A and C", "include B and C", or "include A, B, and C". The term "and/or" describes an association relationship between associated objects and indicates that three relationships may exist. For example, A and/or B may indicate the following cases: Only A exists, both A and B exist, and only B exists. In addition, the character "/" usually indicates an "or" relationship between the associated objects unless otherwise stated.

Unless otherwise stated, ordinal numbers such as "first" and "second" in the embodiments of this application are used to distinguish between a plurality of objects, and are not intended to limit a sequence, a time sequence, priorities, or importance of the plurality of objects.

The technical solutions provided in the embodiments of this application may be applied to a 5G system, or applied to a future communication system or another similar communication system. In addition, the technical solutions provided in the embodiments of this application may be applied to a cellular link, or may be applied to a link between devices, for example, a device to device (2D) link. A D2D link may also be referred to as a sidelink, where the sidelink may also be referred to as a side link, a secondary link, or the like. The D2D link includes a D2D link defined in the 3GPP release (Rel)-12/13, also includes a vehicle-to-vehicle, vehicle-to-mobile, or vehicle-to-everything V2X link defined by 3GPP for the Internet of Vehicles, including the Rel-14/15, and further includes, for example, an NR-system-based V2X link in Rel-16 and subsequent releases which are currently being researched by 3GPP. In the embodiments of this application, the foregoing link between devices is a link established between devices of a same type, and meanings thereof are the same. The devices of the same type may mean that both communication parties are terminal devices, may mean that both communication parties are base station devices, or may mean that both communication parties are relay node devices. This is not limited in the embodiments of this application.

Figure 2:
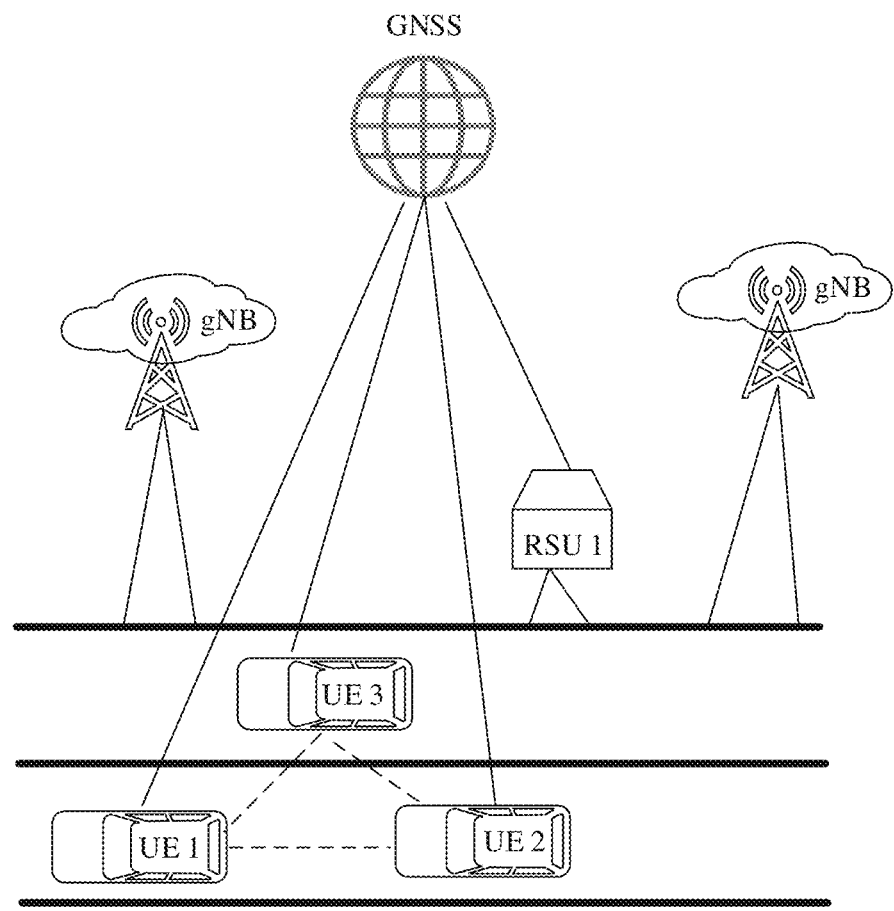
FIG. 2 is a schematic diagram of a network architecture according to an embodiment of this application.

The following describes a network architecture to which an embodiment of this application is applied. FIG. 2 is a network architecture used in an embodiment of this application.

FIG. 2 is a schematic diagram of a V2X network architecture. FIG. 2 includes three terminal devices and four network devices. The three terminal devices are respectively UE 1, UE 2, and UE 3, and the four network devices are respectively two base stations, one RUS, and one global navigation satellite system (GNSS). The base station corresponds to different devices in different systems, for example, may correspond to an eNB in a 4th generation mobile communication technology (the 4th generation, 4G) system, and corresponds to a 5G gNB in a 5G system. A V2X terminal device may also be referred to as a vehicle-mounted device. Vehicle-mounted devices may communicate with each other to exchange and share information such as vehicle status information including a vehicle location and a driving speed, to determine vehicle traffic on a road. The RSU may communicate with each vehicle-mounted device and/or base station device, and may further be configured to detect a road surface condition and guide the vehicle to select an optimal driving route. The base station communicates with each vehicle-mounted device and/or the RSU, and the GNSS may provide positioning and time serving information for another network element. In addition, the vehicle-mounted device in the Internet of Vehicles may further communicate with a person. Specifically, a user may perform information communication with a vehicle by using a wireless communication means such as Wi-Fi, Bluetooth, or cellular, so that the user can monitor and control the vehicle by using a corresponding mobile terminal device. The three UEs and the RUS may be covered by two base stations, and each base station may communicate with the three UEs and the RUS. The base station in FIG. 2 is optional. If there is a base station, it is a scenario with network coverage. If there is no base station device, it is a scenario without network coverage.

It should be noted that a quantity of terminal devices in FIG. 2 is merely an example. In actual application, the network device may provide services for a plurality of terminal devices. The terminal device in FIG. 2 may be a V2X terminal device, for example, a vehicle-mounted terminal device or a vehicle. However, the terminal device in the embodiments of this application is not limited thereto.

The foregoing devices may communicate with each other by using a sidelink and an uplink/downlink. During communication, a spectrum of a cellular link may be used, or an intelligent transportation spectrum near 5.9 GHz or a spectrum on a high frequency band above 6 GHz may be used. A technology for mutual communication between devices may be enhanced based on a communication network protocol (for example, an LTE protocol), or may be enhanced based on a D2D technology.

The following describes, with reference to the accompanying drawings, the technical solutions provided in the embodiments of this application.

Figure 3:
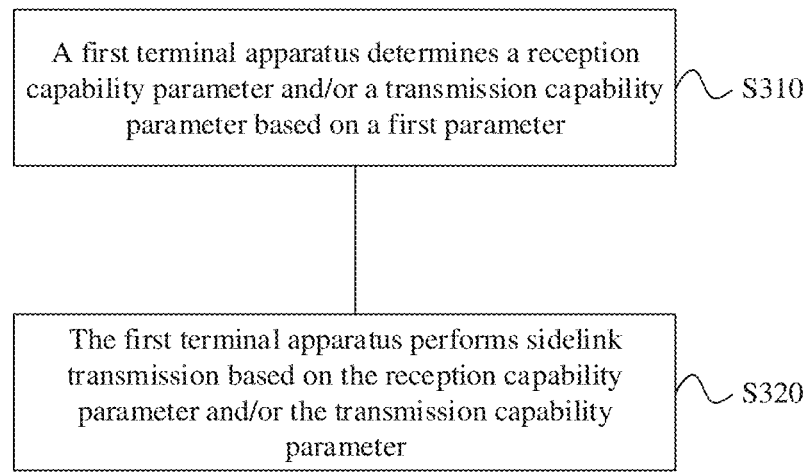
FIG. 3 is a flowchart of a communication method according to an embodiment of this application.

An embodiment of this application provides a communication method. FIG. 3 is a flowchart of the method. In the following description, an example in which the method is applied to the network architecture shown in FIG. 2 is used. In addition, the method may be performed by a first terminal apparatus. The terminal apparatus may be a terminal device or a communication apparatus (for example, a chip system) that can support the terminal device in implementing a function required by the method.

For ease of description, the following is described by using an example in which the method is performed by the first terminal apparatus. For example, the first terminal apparatus below may be any terminal device in the terminal devices in FIG. 2, for example, a vehicle-mounted device, or may be a network device. It should be noted that, in this embodiment of this application, that the method is performed by the first terminal apparatus is only used as an example, and the scenario imposes no limitation. Similarly, a second terminal device may be any terminal device in the terminal devices in FIG. 2, for example, a vehicle-mounted device, or may be a network device. However, this embodiment of this application is not limited thereto.

Specifically, FIG. 3 is a flowchart of the method. A process of the method is described as follows:

S310. The first terminal apparatus determines a reception capability parameter and/or a transmission capability parameter based on a first parameter. For example, the reception capability parameter is used to indicate a reception capability of the first terminal apparatus, and the transmission capability parameter is used to indicate a transmission capability of the first terminal apparatus.

In this embodiment of this application, the first parameter includes one or more of the following: a maximum interval between slots of initial transmission and last retransmission, a subcarrier spacing (SCS), and a sub-band size. The first parameter is preconfigured, or the first parameter is configured by a network device. This is not limited in this embodiment of this application. In addition, the first parameter may be used for sidelink transmission or a cellular link. This is not limited in this embodiment of this application.

For example, the reception capability parameter may be a V2X high reception capability, a V2X moderate reception capability, a V2X low reception capability, or a V2X default reception capability. However, this application is not limited thereto.

In this embodiment of this application, the reception capability parameter includes a quantity of channels that can be received in a first time interval, and/or a maximum quantity of received bits.

For example, a value of the first parameter (for example, at least one of the maximum interval between the slots of initial transmission and last retransmission, the SCS, and the sub-band size) can affect a maximum quantity of channels that can be received in parallel in the first time interval, and/or the maximum quantity of received bits, so that the first terminal apparatus has a reception capability value (an example of the reception capability parameter) corresponding to the value. For example, in case of a fixed bandwidth value, a larger SCS indicates a smaller quantity of channels that can be received in parallel by the first terminal apparatus. For another example, in case of a fixed bandwidth value, a larger sub-band size indicates a smaller quantity of channels that can be received in parallel by the first terminal apparatus. For another example, a value of the first time interval can affect a quantity of slots that the first terminal apparatus needs to receive. For example, a larger first time interval indicates a larger quantity of slots that the first terminal apparatus needs to receive, and a larger corresponding reception capability parameter.

Therefore, in this embodiment of this application, the first terminal apparatus can determine the reception capability parameter based on at least one of the maximum interval between the slots of initial transmission and last retransmission, the subcarrier spacing, and the sub-band size, so that the first terminal apparatus can determine a corresponding reception capability value based on a corresponding parameter value. In this way, when signals sent by many other terminal devices arrive at a receiver of the first terminal apparatus, the first terminal apparatus can demodulate all data packets that may arrive at the receiver of the terminal device, to help reduce, as much as possible, a loss caused because some undetected data packets are missed due to an improper limitation, and help achieve an optimal balance point between a cost and performance of the terminal.

Herein, the quantity of channels that can be received in the first time interval may be further understood as a quantity of reception users in the first time interval. In some optional embodiments, the reception capability parameter may further include a quantity of channels that can be received in the first time interval and a quantity (which may also be referred to as a quantity that is of RBs and that corresponds to the quantity of channels that can be received in the first time interval) that is of resource blocks (RB) that can be detected and that corresponds to the quantity of channels that can be received in the first time interval.

For example, the channel that can be received in the first time interval is, for example, a physical sidelink control channel (PSCCH). However, this embodiment of this application is not limited thereto.

In some optional embodiments, the quantity of channels that can be received includes a quantity of control channels that can be received and/or a quantity of data channels corresponding to the control channels.

In some optional embodiments, the reception capability parameter may include a quantity of control channels that can be received in the first time interval and a corresponding quantity of RBs that can be received, and/or a quantity of data channels that can be received in the first time interval and a corresponding quantity of RBs that can be received.

Optionally, the PSCCH appearing in the slot further includes a first-level PSCCH and/or a second-level PSCCH. In other words, optionally, a quantity of PSCCHs that can be received in the first time interval may include a quantity of first-level PSCCHs and/or a quantity of second-level PSCCHs.

In some optional embodiments, the reception capability parameter may include a quantity of first-level PSCCHs that can be received in the first time interval and a corresponding quantity of RBs that can be received, and/or a quantity of second-level PSCCHs that can be received in the first time interval and a corresponding quantity of RBs that can be received.

In some optional embodiments, the first time interval is one slot, or is less than or equal to an interval between initial transmission and last retransmission of one data packet, or is other signaling-configured or predefined duration.

In a possible case, initial transmission and retransmission of one data packet are initial transmission and retransmission that are based on blind retransmission. Blind retransmission means that when a transmit end sends a data packet to a receive end, a quantity of sending times of each data packet is signaling indicated, configured, predefined, or preconfigured, and the receive end does not need to feed back, to the transmit end, a state or a result that indicates whether the data packet is successfully received. In other words, in a data transmission process based on blind retransmission, the transmit end only needs to send a data packet to the receive end based on a corresponding quantity of sending times, and does not need to learn whether the receive end receives the data packet. For example, the transmit end may continuously send a same data packet to the receive end four times. When receiving the data packet, the receive end does not need to send an acknowledgement (ACK) to the transmit end; or when the receive end does not receive the data packet within preset time, the receive end does not need to send a negative acknowledgement (NACK) to the transmit end.

In another possible case, the initial transmission and the retransmission are initial transmission and retransmission that are based on a hybrid automatic repeat request (HARQ). HARQ transmission means that when a transmit end sends a data packet to a receive end, the receive end needs to feed back, to the transmit end, a state or a result that indicates whether the data packet is successfully received. In other words, in a HARQ-based transmission process, after the transmit end sends a data packet to the receive end, if the transmit end receives a NACK indication from the receive end, the transmit end continues to send the data packet. If the transmit end receives an ACK indication from the receive end, the transmit end stops sending the data packet.

In some possible implementations, in HARQ-based data transmission, a maximum quantity of retransmission times of one data packet may be predefined. For example, in an NR system, a same data packet can be retransmitted a maximum of 32 times. In an actual communication process, a quantity of retransmission times in HARQ-based transmission may be configured or indicated within a maximum quantity of retransmission times.

In some optional embodiments, supported maximum quantities of processes may be separately defined for blind retransmission and HARQ retransmission.

In an example, the supported maximum quantity of processes in blind retransmission may be 4, 8, 16, or another quantity. This is not limited in this embodiment of this application.

In an example, in HARQ-based data transmission, the terminal device needs to detect data of a plurality of communication apparatuses. Therefore, a maximum quantity that is of HARQ processes and that is supported by the terminal device needs to be defined. For example, in the NR system, a maximum of 16 HARQ processes are supported. Each HARQ process may correspond to data received from another communication apparatus or data sent to another communication apparatus.

Optionally, a total maximum quantity that is of HARQ processes and that is supported by the terminal device is the same as a total quantity of channels that can be received by the terminal device. In other words, optionally, when the terminal device supports a plurality of HARQ processes and the terminal device can receive a plurality of channels, the plurality of HARQ processes are in a one-to-one correspondence with the plurality of channels.

Alternatively, optionally, the maximum quantity that is of HARQ processes and that is supported by the terminal device is the same as a quantity that is of reception users and that can be supported by the terminal device. In other words, when the terminal device supports a plurality of HARQ processes and the terminal device can support a plurality of reception users, the plurality of HARQ processes are in a one-to-one correspondence with the plurality of reception users.

In the following descriptions of this embodiment of this application, when a detection capability of the terminal device is defined in the first time interval, description is made based on a maximum quantity that is of control channels and that is supported by the terminal device. Optionally, when the method is used for a D2D link, the control channel may be a PSCCH. In this embodiment of this application, the maximum quantity that is of control channels and that is supported by the terminal device may also be used to indicate the maximum quantity that is of HARQ processes and that is supported by the terminal device, or indicate the quantity that is of reception users and that can be supported by the terminal device.

In this embodiment of this application, the interval between initial transmission and last retransmission may be one or more slots. This is not limited in this embodiment of this application.

In some possible implementations, the quantity of channels that can be received in the first time interval is less than or equal to a product of a quantity of channels received in each slot in the first time interval and a quantity of slots in the first time interval. In this case, the quantities of channels received in all the slots may be the same or different.

In some embodiments, total quantities of channels that can be received in all the slots may be the same, but quantities of channels actually received in all the slots may be the same or different. For example, from a perspective of a receiver of a terminal device, in each slot, quantities of channels arriving at all terminal devices may be the same or different.

For example, when the terminal device receives a data packet on all channels in each slot in the first time interval, the quantity of channels that can be received by the terminal device in the first time interval is equal to the product of the quantity of channels received in each slot in the first time interval and the quantity of slots in the first time interval.

In a specific example, it is assumed that a quantity of channels received by the terminal device in one slot is M, and the interval between initial transmission and last retransmission includes K slots. It is assumed that all received data is incorrectly decoded in initial transmission and retransmission (including HARQ retransmission and blind retransmission). In this case, the terminal device needs to buffer data on B channels, where $B=M \times K$, and B, M, and K are all positive integers.

In an example, for a subcarrier spacing of 15 KHz, values of K, M, and B may be as follows: K=15, M=10, and B=M×K=150.

In other words, a total maximum quantity that is of PSCCHs that can be detected in the first time interval and that is supported by the terminal device is N, where N≤B, and N is a positive integer.

In some possible implementations, when quantities of channels received in a plurality of slots in the first time interval are different, the quantity of channels that can be received in the first time interval is less than or equal to a product of a quantity of channels received in a slot and the quantity of slots in the first time interval, where the slot is in the first time interval and has a largest or smallest quantity of received channels. For example, when the first time interval includes three slots, and quantities that are of received channels and that respectively correspond to the three slots are M1=8, M2=10, and M3=11, B=11×3=33 or B=8×3=24. Therefore, when B=33, a value of N may be equal to 33 or an integer less than 33; or when B=24, a value of N may be equal to 24 or an integer less than 24.

In some possible implementations, the maximum quantity of received bits includes at least one of the following:
- a maximum quantity of data channel transport block bits received in a slot (maximum number of bits of an SCH transport block transmitted within a slot);
- a maximum quantity of bits of a data channel transport block received in a slot (maximum number of SCH transport block bits transmitted within a slot); and
- a total maximum quantity of received bits, namely, a maximum quantity that is of received bits and that can be supported by the terminal device.

In this embodiment of this application, the transmission capability parameter includes a maximum quantity of transmitted bits. In some possible implementations, the maximum quantity of transmitted bits includes at least one of the following:
- a maximum quantity of data channel transport block bits transmitted in a slot (maximum number of bits of an SCH transport block transmitted within a slot);
- a maximum quantity of bits of a data channel transport block transmitted in a slot (maximum number of SCH transport block bits transmitted within a slot); and
- a total maximum quantity of transmitted bits, namely, a maximum quantity that is of transmitted bits and that can be supported by the terminal device.

It should be noted that in this embodiment of this application, the maximum quantity of transmitted bits/the maximum quantity of received bits can mainly affect a buffer size, data processing time, and a data processing speed of the first terminal apparatus device, and therefore can affect a cost, processing time, and power consumption of the first terminal apparatus.

In this embodiment of this application, a value of the first parameter (for example, at least one of the maximum interval between the slots of initial transmission and last retransmission, the SCS, and the sub-band size) can affect a maximum quantity of channels that can be sent in parallel in the first time interval, and/or the maximum quantity of transmitted bits, so that the first terminal apparatus has a transmission capability value (an example of the transmission capability parameter) corresponding to the value. For example, in case of a fixed bandwidth value, a larger SCS indicates a smaller quantity of channels that can be sent in parallel by the first terminal apparatus. For another example, in case of a fixed bandwidth value, a larger sub-band size indicates a smaller quantity of channels that can be sent in parallel by the first terminal apparatus. For another example, a value of the first time interval can affect a quantity of slots that the first terminal apparatus needs to send. For example, a larger first time interval indicates a larger quantity of slots that the first terminal apparatus needs to receive, and a larger corresponding transmission capability parameter.

Therefore, in this embodiment of this application, the first terminal apparatus can determine the transmission capability parameter based on at least one of the maximum interval between the slots of initial transmission and last retransmission, the subcarrier spacing, and the sub-band size, so that the first terminal apparatus can determine a corresponding transmission capability value based on a corresponding parameter value. In this way, when a large quantity of data packets are to be sent and signals sent by many other terminal devices arrive at a receiver of the first terminal apparatus, the first terminal apparatus can properly determine a quantity of transmission data packets and a size of the data packet, to help reduce, as much as possible, a quantity of to-be-sent data packets discarded due to an improper transmission buffer size.

In some possible implementations, the quantity of channels that can be received in the first time interval belongs to at least one type of quantity of channels that can be received in the first time interval.

In some possible cases, the subcarrier spacing belongs to at least one type of subcarrier spacing. In this case, the at least one type of quantity of channels that can be received in the first time interval is in a one-to-one correspondence with the at least one type of subcarrier spacing, and a larger subcarrier spacing indicates a smaller quantity that is of channels that can be received in the first time interval and that corresponds to the subcarrier spacing.

For example, terminal devices with different terminal device reception capabilities may be defined in the protocol, for example, terminal devices with two different reception capabilities. For terminal devices with different reception capabilities, a same subcarrier spacing corresponds to different quantities of channels that can be received in the first time interval.

Optionally, the quantity of channels that can be received in the first time interval is strictly or approximately in inverse proportion to a value of the SCS, and/or optionally, the quantity that is of RBs and that corresponds to the quantity of channels that can be received in the first time interval is strictly or approximately in inverse proportion to the value of the SCS.

In an example, in case of a 20 MHz bandwidth, Table 1 shows quantities that are of channels that can be detected by terminal devices with two different reception capabilities and that correspond to the at least one type of SCS. As shown in Table 1, the at least one type of SCS is, for example, 15 KHz/30 KHz/60 KHz/120 KHz, and the two capabilities are respectively a reception capability 1 and a reception capability 2. In Table 1, a column in which B1 is located indicates quantities that are of channels that can be received in the first time interval, that correspond to different values of SCSs, and that exist when the reception capability is 1, and a column in which B2 is located indicates quantities that are of channels that can be received in the first time interval, that correspond to different values of SCSs, and that exist when the reception capability is 2.

TABLE 1

| SCS (kHz) | B1 | B2 | N_RB1 | N_RB2 |
|---|---|---|---|---|
| 15 | 10 | 20 | 100 | 136 |
| 30 | 6 | 12 | 50 | 68 |
| 60 | 2 | 6 | 25 | 34 |
| 120 | 1 | 3 | 12 | 17 |

In some embodiments, the column in which B1 is located may further indicate a quantity that is of first-level control channels that can be received in the first time interval and that exists when the reception capability is 1, and/or a quantity that is of second-level control channels that can be received in the first time interval and that exists when the reception capability is 1, and the column in which B2 is located may further indicate a quantity that is of first-level control channels that can be received in the first time interval and that exists when the reception capability is 2, and/or a quantity that is of second-level control channels that can be received in the first time interval and that exists when the reception capability is 2.

Therefore, in this embodiment of this application, the first terminal apparatus, namely, a receive-end device, may determine, in a predefined manner (for example, Table 1) based on the value of the SCS and a capability type (for example, the reception capability 1 or the reception capability 2) supported by the first terminal apparatus, the quantity that is of channels that can be received in the first time interval and that is supported by the first terminal apparatus, so that the receive-end device determines, based on the value of the SCS, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

Optionally, when the reception capability parameter further includes the quantity that is of RBs that can be detected and that corresponds to the quantity of channels that can be received in the first time interval, the quantity that is of RBs and that corresponds to the quantity of channels that can be received in the first time interval belongs to at least one type of quantity that is of RBs and that corresponds to the quantity of channels that can be received in the first time interval. In this case, the at least one type of quantity that is of RBs and that corresponds to the quantity of channels that can be received in the first time interval is in a one-to-one correspondence with at least one type of SCS, and a larger SCS indicates a smaller quantity that is of RBs and that corresponds to the quantity of channels that can be received in the first time interval and corresponds to the SCS. In addition, for terminal devices with different reception capabilities defined in the protocol, a same SCS corresponds to different quantities that are of RBs and that correspond to quantities of channels that can be received in the first time interval.

As shown in the foregoing Table 1, a column in which N_RB1 is located indicates quantities that are of RBs, that correspond to quantities of channels that can be received in the first time interval and correspond to different SCSs, and that exist when the reception capability is 1, and a column in which N_RB2 is located indicates quantities that are of RBs, that correspond to the quantity of channels that can be received in the first time interval and correspond to different SCSs, and that exist when the reception capability is 2.

It should be noted that the 20 MHz bandwidth is used as an example for description in this embodiment of this application, but this embodiment of this application is not limited thereto. For example, the bandwidth may be 10 MHz, 30 MHz, or another value.

In another example, in case of a 10 MHz bandwidth, Table 1a shows corresponding values of B1, B2, N_RB_1, and N_RB_1. In Table 1a, different values of SCSs correspond to two different quantities B1 and B2 of detection channels and different quantities N_RB1 and N_RB2 of RBs. For example, in the first column of Table 1a, when the value of the SCS is 15 KHz, for the reception capability 1, the quantity of detection channels is 10, and the quantity of detected RBs is 50; and for the reception capability 2, the quantity of detection channels is 20, and the quantity of detected RBs is 68. For another example, in the first column of Table 1a, when the value of the SCS is 30 KHz, for the reception capability 1, the quantity of detection channels is 6, and the quantity of detected RBs is 25; and for the reception capability 2, the quantity of detection channels is 12, and the quantity of detected RBs is 34.

TABLE 1a

| SCS (KHz) | B1 | B2 | N_RB1 | N_RB2 |
|---|---|---|---|---|
| 15 | 10 | 20 | 50 | 68 |
| 30 | 6 | 12 | 25 | 34 |
| 60 | 2 | 6 | 12 | 17 |
| 120 | 1 | 3 | 6 | 8 |

It should be noted that, in this embodiment of this application, that two different terminal device reception capabilities may be defined in the protocol is only used as an example for description. However, this embodiment of this application is not limited thereto. For example, one, three, or more different terminal device reception capabilities may be defined in the protocol, and the reception capabilities all fall within the protection scope of this embodiment of this application.

Therefore, in this embodiment of this application, the first terminal apparatus, namely, a receive-end device, may determine, in a predefined manner (for example, Table 1a) based on the value of the SCS and a capability type (for example, the reception capability 1 or the reception capability 2) supported by the first terminal apparatus, the quantity that is of RBs, that corresponds to the quantity of channels that can be received in the first time interval, and that is supported by the first terminal apparatus, so that the receive-end device determines, based on the value of the SCS, a reception capability value (namely, the quantity that is of RBs and that corresponds to the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the interval between the slots of initial transmission and last retransmission belongs to at least one type of interval between the slots of initial transmission and last retransmission. In this case, the at least one type of quantity of channels that can be received in the first time interval is in a one-to-one correspondence with the at least one type of interval between the slots of initial transmission and last retransmission, and a larger interval between the slots of initial transmission and last retransmission indicates a larger quantity that is of channels that can be received in the first time interval and that corresponds to the interval between the slots of initial transmission and last retransmission.

Optionally, the quantity of channels that can be received in the first time interval is strictly or approximately in direct proportion to a quantity of slots included in the at least one type of interval between the slots of initial transmission and last retransmission.

For example, for blind transmission, the interval between initial transmission and last retransmission may include 16 slots. For HARQ-based retransmission, the interval between initial transmission and last retransmission may be a value obtained by multiplying the maximum quantity of retransmission times by each HARQ round-trip time. For example, each HARQ round-trip time includes four slots, and the maximum quantity of retransmission times is 32. In this case, the interval between initial transmission and last retransmission includes 128 slots.

Optionally, the at least one type of quantity that is of RBs and that corresponds to the quantity of channels that can be received in the first time is in a one-to-one correspondence with the at least one type of interval between the slots of initial transmission and last retransmission, and a larger interval between the slots of initial transmission and last retransmission indicates a larger quantity that is of RBs and that corresponds to the quantity of channels that can be received in the first time interval and corresponds to the interval between the slots of initial transmission and last retransmission.

For example, for terminal devices with different reception capabilities defined in the protocol, a same interval between the slots of initial transmission and last retransmission corresponds to different quantities of channels that can be received in the first time interval, or different quantities that are of RBs and that correspond to quantities of channels that can be received in the first time interval.

In an example, in case of a 20 MHz bandwidth, Table 2 shows quantities of channels that can be detected by terminal devices with two different reception capabilities. As shown in Table 2, a quantity K of slots included in the at least one type of interval between the slots of initial transmission and last retransmission is, for example, 1/2/3/4. In Table 2, a column in which B1 is located indicates quantities that are of channels that can be received in the first time interval, that correspond to different intervals between the slots of initial transmission and last retransmission, and that exist when the reception capability is 1, and a column in which B2 is located indicates quantities that are of channels that can be received in the first time interval, that correspond to different intervals between the slots of initial transmission and last retransmission, and that exist when the reception capability is 2.

TABLE 2

| K | B1 | B2 |
| --- | --- | --- |
| 1 | 10 | 20 |
| 2 | 20 | 40 |
| 3 | 30 | 60 |
| 4 | 40 | 80 |

Therefore, in this embodiment of this application, the first terminal apparatus, namely, a receive-end device, may determine, in a predefined manner (for example, Table 2) based on the interval between the slots of initial transmission and last retransmission and a capability type (for example, the reception capability 1 or the reception capability 2) supported by the first terminal apparatus, the quantity that is of channels that can be received in the first time interval and that is supported by the first terminal apparatus, so that the receive-end device determines, based on the interval between the slots of initial transmission and last retransmission, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the sub-band size belongs to at least one type of sub-band size. In this case, the at least one type of quantity of channels that can be received in the first time interval is in a one-to-one correspondence with the at least one type of sub-band size, and a larger sub-band size indicates a smaller quantity that is of channels that can be received in the first time interval and that corresponds to the sub-band size.

Optionally, the quantity of channels that can be received in the first time interval is strictly or approximately in inverse proportion to the sub-band size.

Optionally, the at least one type of quantity that is of RBs and that corresponds to the quantity of channels that can be received in the first time interval is in a one-to-one correspondence with the at least one type of sub-band size, and a larger sub-band size indicates a smaller quantity that is of RBs and that corresponds to the quantity of channels that can be received in the first time interval and corresponds to the sub-band size.

For example, for terminal devices with different reception capabilities defined in the protocol, a same sub-band size corresponds to different quantities of channels that can be received in the first time interval, or different quantities that are of RBs and that correspond to quantities of channels that can be received in the first time interval.

In an example, in case of a 20 MHz bandwidth, Table 3 shows quantities of channels that can be detected by terminal devices with two different reception capabilities. As shown in Table 3, the at least one type of sub-band size is, for example, 4/5/6/10 physical resource blocks PRBs. In Table 3, a column in which B1 is located indicates quantities that are of channels that can be received in the first time interval, that correspond to different sub-band sizes, and that exist when the reception capability is 1, and a column in which B2 is located indicates quantities that are of channels that can be received in the first time interval, that correspond to different sub-band sizes, and that exist when the reception capability is 2.

TABLE 3

| Quantity of PRBs included in a sub-band | B1 | B2 |
| --- | --- | --- |
| 4 | 25 | 30 |
| 5 | 20 | 25 |
| 6 | 15 | 20 |
| 10 | 10 | 15 |

Therefore, in this embodiment of this application, the first terminal apparatus, namely, a receive-end device, may determine, in a predefined manner (for example, Table 3) based on a sub-band size and a capability type (for example, the reception capability 1 or the reception capability 2) supported by the first terminal apparatus, the quantity that is of channels that can be received in the first time interval and that is supported by the first terminal apparatus, so that the receive-end device determines, based on the sub-band size, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible implementations, the maximum quantity of received bits belongs to at least one type of maximum quantity of received bits.

In some possible cases, the subcarrier spacing belongs to at least one type of subcarrier spacing. In this case, the at least one type of maximum quantity of received bits is in a one-to-one correspondence with the at least one type of subcarrier spacing, and a larger subcarrier spacing indicates a smaller maximum quantity that is of received bits and that corresponds to the subcarrier spacing.

Optionally, the maximum quantity of received bits of the terminal device is strictly or approximately in inverse proportion to a value of the SCS.

For example, for terminal devices with different reception capabilities defined in the protocol, a same SCS corresponds to different maximum quantities of received bits.

In an example, in case of a 20 MHz bandwidth, Table 4 shows maximum quantities of received bits of terminal devices with two different reception capabilities. As shown in Table 4, the at least one type of SCS is, for example, 15 KHz/30 KHz/60 KHz/120 KHz, and the two reception capabilities are respectively a capability 1 and a capability 2. In Table 4, a column in which C1 is located indicates maximum quantities that are of received bits of the terminal device, that correspond to different values of SCSs, and that exist when the reception capability is 1, and a column in which C2 is located indicates maximum quantities that are of received bits of the terminal device, that correspond to different values of SCSs, and that exist when the reception capability is 2.

TABLE 4

| SCS (kHz) | C1 | C2 |
|---|---|---|
| 15 | 25456 | 31704 |
| 30 | 12728 | 15852 |
| 60 | 6364 | 7926 |
| 120 | 3182 | 3963 |

Therefore, in this embodiment of this application, the first terminal apparatus, namely, a receive-end device, may determine the maximum quantity of received bits of the first terminal apparatus in a predefined manner (for example, Table 4) based on the value of the SCS and a capability type (for example, the reception capability 1 or the reception capability 2) supported by the first terminal apparatus, so that the receive-end device determines, based on the value of the SCS, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the interval between the slots of initial transmission and last retransmission belongs to at least one type of maximum interval between the slots of initial transmission and last retransmission. In this case, the at least one type of maximum quantity of received bits is in a one-to-one correspondence with the at least one type of maximum interval between the slots of initial transmission and last retransmission, and a larger maximum interval between the slots of initial transmission and last retransmission indicates a larger maximum quantity that is of received bits and that corresponds to the maximum interval between the slots of initial transmission and last retransmission.

Optionally, the maximum quantity of received bits is strictly or approximately in direct proportion to the maximum interval between the slots of initial transmission and last retransmission.

For example, for terminal devices with different reception capabilities defined in the protocol, a same interval between the slots of initial transmission and last retransmission corresponds to different maximum quantities of received bits.

In an example, in case of a 15 KHz subcarrier spacing, Table 5 shows maximum quantities of received bits of terminal devices with two different reception capabilities. As shown in Table 5, a quantity K of slots included in the at least one type of interval between the slots of initial transmission and last retransmission is, for example, 1/2/3/4. In Table 5, a column in which C1 is located indicates maximum quantities that are of received bits of the terminal device, that correspond to different intervals between the slots of initial transmission and last retransmission, and that exist when the reception capability is 1, and a column in which C2 is located indicates maximum quantities that are of received bits of the terminal device, that correspond to different intervals between the slots of initial transmission and last retransmission, and that exist when the reception capability is 2.

TABLE 5

| K | C1 | C2 |
|---|---|---|
| 1 | 25456 | 31704 |
| 2 | 2*25456 | 2*31704 |
| 3 | 3*25456 | 3*31704 |
| 4 | 4*25456 | 4*31704 |

Therefore, in this embodiment of this application, the first terminal apparatus, namely, a receive-end device, may determine the maximum quantity of received bits of the first terminal apparatus in a predefined manner (for example, Table 5) based on the interval between the slots of initial transmission and last retransmission and a capability type (for example, the reception capability 1 or the reception capability 2) supported by the first terminal apparatus, so that the receive-end device determines, based on the interval between the slots of initial transmission and last retransmission, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the sub-band size belongs to at least one type of sub-band size. For a special subcarrier spacing, the at least one type of maximum quantity of received bits is in a one-to-one correspondence with the at least one type of sub-band size, and a larger sub-band size indicates a smaller maximum quantity that is of received bits and that corresponds to the sub-band size.

Optionally, the maximum quantity of received bits is strictly or approximately in direct proportion to the sub-band size.

For example, for terminal devices with different reception capabilities defined in the protocol, a same sub-band size corresponds to different maximum quantities of received bits.

In an example, in case of a 15 KHz subcarrier spacing, Table 6 shows maximum quantities of received bits of terminal devices with two different reception capabilities. As shown in Table 6, the at least one type of sub-band size is, for example, 4/5/6/10 physical resource blocks PRBs. In Table 6, a column in which C1 is located indicates maximum quantities that are of received bits of the terminal device, that correspond to different sub-band sizes, and that exist when the reception capability is 1, and a column in which C2 is located indicates maximum quantities that are of received bits of the terminal device, that correspond to different sub-band sizes, and that exist when the reception capability is 2.

TABLE 6

| Quantity of PRBs included in a sub-band | C1 | C2 |
|---|---|---|
| 4 | 25456 | 31704 |
| 5 | floor(25456/2) | floor(31704/2) |
| 6 | floor(25456/3) | floor(31704/3) |
| 10 | floor(25456/4) | floor(31704/4) |

In the foregoing table, floor( ) indicates a rounding down operation.

Therefore, in this embodiment of this application, the first terminal apparatus, namely, a receive-end device, may determine the maximum quantity of received bits of the first terminal apparatus in a predefined manner (for example, Table 6) based on the sub-band size and a capability type (for example, the reception capability 1 or the reception capability 2) supported by the first terminal apparatus, so that the receive-end device determines, based on the sub-band size, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible implementations, the maximum quantity of transmitted bits belongs to at least one type of maximum quantity of transmitted bits.

In a possible case, the subcarrier spacing belongs to at least one type of subcarrier spacing. In this case, the at least one type of maximum quantity of transmitted bits is in a one-to-one correspondence with the at least one type of subcarrier spacing, and a larger subcarrier spacing indicates a smaller maximum quantity that is of transmitted bits and that corresponds to the subcarrier spacing.

Optionally, the maximum quantity of transmitted bits of the terminal device is strictly or approximately in inverse proportion to a value of the SCS.

For example, for terminal devices with different transmission capabilities defined in the protocol, a same SCS corresponds to different maximum quantities of transmitted bits.

In an example, in case of a 20 MHz bandwidth, Table 7 shows maximum quantities of transmitted bits of terminal devices with two different transmission capabilities. As shown in Table 7, the at least one type of SCS is, for example, 15 KHz/30 KHz/60 KHz/120 KHz, and the two capabilities are respectively a transmission capability 1 and a transmission capability 2. In Table 7, a column in which D1 is located indicates maximum quantities that are of transmitted bits of the terminal device, that correspond to different values of SCSs, and that exist when the transmission capability is 1, and a column in which D2 is located indicates maximum quantities that are of transmitted bits of the terminal device, that correspond to different values of SCSs, and that exist when the transmission capability is 2.

TABLE 7

| SCS (kHz) | D1 | D2 |
|---|---|---|
| 15 | 25456 | 31704 |
| 30 | 12728 | 15852 |
| 60 | 6364 | 7926 |
| 120 | 3182 | 3963 |

It should be noted that, in this embodiment of this application, that two different terminal device transmission capabilities may be defined in the protocol is only used as an example for description. However, this embodiment of this application is not limited thereto. For example, one, three, or more different terminal device transmission capabilities may be defined in the protocol, and the transmission capabilities all fall within the protection scope of this embodiment of this application.

Therefore, in this embodiment of this application, the first terminal apparatus, namely, a transmit-end device, may determine the maximum quantity of transmitted bits of the first terminal apparatus in a predefined manner (for example, Table 7) based on the value of the SCS and a capability type (for example, the transmission capability 1 or the transmission capability 2) supported by the first terminal apparatus, so that the transmit-end device determines, based on the value of the SCS, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

In a possible case, the maximum interval between the slots of initial transmission and last retransmission belongs to at least one type of maximum interval between the slots of initial transmission and last retransmission. In this case, the at least one type of maximum quantity of transmitted bits is in a one-to-one correspondence with the at least one type of maximum interval between the slots of initial transmission and last retransmission, and a larger maximum interval between the slots of initial transmission and last retransmission indicates a larger maximum quantity that is of transmitted bits and that corresponds to the maximum interval between the slots of initial transmission and last retransmission.

Optionally, the maximum quantity of transmitted bits of the terminal device is strictly or approximately in direct proportion to the maximum interval between the slots of initial transmission and last retransmission.

For example, for terminal devices with different transmission capabilities defined in the protocol, a same interval between the slots of initial transmission and last retransmission corresponds to different maximum quantities of transmitted bits.

In an example, in case of a 15 KHz subcarrier spacing, Table 8 shows maximum quantities of transmitted bits of terminal devices with two different transmission capabilities. As shown in Table 8, a quantity K of slots included in the at least one type of interval between the slots of initial transmission and last retransmission is, for example, 1/2/3/4. In Table 8, a column in which D1 is located indicates maximum quantities that are of transmitted bits of the terminal device, that correspond to different intervals between the slots of initial transmission and last retransmission, and that exist when the transmission capability is 1, and a column in which D2 is located indicates maximum quantities that are of transmitted bits of the terminal device, that correspond to different intervals between the slots of initial transmission and last retransmission, and that exist when the transmission capability is 2.

TABLE 8

| K | D1 | D2 |
|---|---|---|
| 1 | 25456 | 31704 |
| 2 | 2*25456 | 2*31704 |
| 3 | 3*25456 | 3*31704 |
| 4 | 4*25456 | 4*31704 |

Therefore, in this embodiment of this application, the first terminal apparatus, namely, a transmit-end device, may determine the maximum quantity of transmitted bits of the first terminal apparatus in a predefined manner (for example, Table 8) based on the interval between the slots of initial transmission and last retransmission and a capability type (for example, the transmission capability 1 or the transmission capability 2) supported by the first terminal apparatus, so that the transmit-end device determines, based on the interval between the slots of initial transmission and last retransmission, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

In a possible case, the sub-band size belongs to at least one type of sub-band size. For a special subcarrier spacing, the at least one type of maximum quantity of transmitted bits is in a one-to-one correspondence with the at least one type of sub-band size, and a larger sub-band size indicates a smaller maximum quantity that is of transmitted bits and that corresponds to the sub-band size.

Optionally, the maximum quantity of transmitted bits of the terminal device is strictly or approximately in inverse proportion to the sub-band size.

For example, for terminal devices with different transmission capabilities defined in the protocol, a same sub-band size corresponds to different maximum quantities of transmitted bits.

In an example, in case of a 15 KHz subcarrier spacing, Table 9 shows maximum quantities of transmitted bits of terminal devices with two different transmission capabilities. As shown in Table 9, the at least one type of sub-band size is, for example, 4/5/6/10 physical resource blocks PRBs. In Table 9, a column in which D1 is located indicates maximum quantities that are of transmitted bits of the terminal device, that correspond to different sub-band sizes, and that exist when the transmission capability is 1, and a column in which D2 is located indicates maximum quantities that are of transmitted bits of the terminal device, that correspond to different sub-band sizes, and that exist when the transmission capability is 2.

TABLE 9

| Quantity of PRBs included in a sub-band | D1 | D2 |
|---|---|---|
| 4 | 25456 | 31704 |
| 5 | 12728 | 15852 |
| 6 | 6364 | 7926 |
| 10 | 3182 | 3963 |

Therefore, in this embodiment of this application, the first terminal apparatus, namely, a transmit-end device, may determine the maximum quantity of transmitted bits of the first terminal apparatus in a predefined manner (for example, Table 9) based on the sub-band size and a capability type (for example, the transmission capability 1 or the transmission capability 2) supported by the first terminal apparatus, so that the transmit-end device determines, based on the sub-band size, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

Optionally, in some possible implementations, the first parameter may further include one or more of the following:
a reception type class, a bandwidth size, a carrier quantity or a carrier combination, and a spatial layer quantity.

For example, a bandwidth may be a channel bandwidth, a carrier bandwidth, or a BWP bandwidth. This is not limited in this embodiment of this application.

In some possible implementations, the quantity of channels that can be received in the first time interval belongs to at least one type of quantity of channels that can be received in the first time interval.

In some possible cases, the reception type class belongs to at least one type of reception type class. In this case, the at least one type of quantity of channels that can be received in the first time interval is in a one-to-one correspondence with the at least one type of reception type class, and a higher reception type class indicates a larger quantity that is of channels that can be received in the first time interval and that corresponds to the reception type class.

Optionally, the at least one type of quantity that is of RBs and that corresponds to the quantity of channels that can be received in the first time is in a one-to-one correspondence with the at least one type of reception type class, and a higher reception type class indicates a larger quantity that is of RBs and that corresponds to the quantity of channels that can be received in the first time interval and corresponds to the reception type class.

For example, for terminal devices with different reception capabilities defined in the protocol, a same reception type class corresponds to different quantities of channels that can be received in the first time interval, or different quantities that are of RBs and that correspond to quantities of channels that can be received in the first time interval.

In an example, in case of a 20 MHz bandwidth, Table 10 shows quantities of channels that can be detected by terminal devices with two different reception capabilities. As shown in Table 10, the at least one type of reception type class is, for example, 1/2/3/4. In Table 10, a column in which B1 is located indicates quantities that are of channels that can be received in the first time interval, that correspond to different reception type classes, and that exist when the reception capability is 1, and a column in which B2 is located indicates quantities that are of channels that can be received in the first time interval, that correspond to different reception type classes, and that exist when the reception capability is 2.

TABLE 10

| Reception type class | B1 | B2 |
|---|---|---|
| 1 | 10 | 20 |
| 2 | 15 | 25 |
| 3 | 20 | 30 |
| 4 | 25 | 35 |

Therefore, in this embodiment of this application, the first terminal apparatus, namely, a receive-end device, may determine, in a predefined manner (for example, Table 10) based on the reception type class and a capability type (for example, the reception capability 1 or the reception capability 2) supported by the first terminal apparatus, the quantity that is of channels that can be received in the first time interval and that is supported by the first terminal apparatus, so that the receive-end device determines, based on the reception type class, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the bandwidth size belongs to at least one type of bandwidth size. In this case, the at least one type of quantity of channels that can be received in the first time interval is in a one-to-one correspondence with the at least one type of bandwidth size, and a larger bandwidth size indicates a larger quantity that is of channels that can be received in the first time interval and that corresponds to the bandwidth size.

Optionally, the at least one type of quantity that is of RBs and that corresponds to the quantity of channels that can be received in the first time interval is in a one-to-one correspondence with the at least one type of bandwidth size, and a larger bandwidth size indicates a larger quantity that is of RBs and that corresponds to the quantity of channels that can be received in the first time interval and corresponds to the bandwidth size.

Optionally, the quantity of channels that can be received in the first time interval is strictly or approximately in direct proportion to the bandwidth size.

For example, for terminal devices with different reception capabilities defined in the protocol, a same bandwidth size corresponds to different quantities of channels that can be received in the first time interval, or different quantities that are of RBs that correspond to quantities of channels that can be received in the first time interval.

In an example, in case of a 15 KHz subcarrier spacing, Table 11 shows quantities of channels that can be detected by terminal devices with two different reception capabilities. As shown in Table 11, the at least one type of bandwidth size is, for example, 20 MHz/30 MHz/40 MHz/50 MHz/60 MHz/70 MHz. In Table 11, a column in which B1 is located indicates quantities that are of channels that can be received in the first time interval, that correspond to different bandwidth sizes, and that exist when the reception capability is 1, and a column in which B2 is located indicates quantities that are of channels that can be received in the first time interval, that correspond to different bandwidth sizes, and that exist when the reception capability is 2.

TABLE 11

| Bandwidth size (MHz) | B1 | B2 |
|---|---|---|
| 20 | 10 | 20 |
| 30 | 15 | 30 |
| 40 | 20 | 40 |
| 50 | 25 | 50 |
| 60 | 30 | 60 |
| 70 | 35 | 70 |

Therefore, in this embodiment of this application, the first terminal apparatus, namely, a receive-end device, may determine, in a predefined manner (for example, Table 11) based on the bandwidth size and a capability type (for example, the reception capability 1 or the reception capability 2) supported by the first terminal apparatus, the quantity that is of channels that can be received in the first time interval and that is supported by the first terminal apparatus, so that the receive-end device determines, based on the bandwidth size, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the carrier quantity belongs to at least one type of carrier quantity. In this case, the at least one type of quantity of channels that can be received in the first time interval is in a one-to-one correspondence with the at least one type of carrier quantity, and a larger carrier quantity indicates a larger quantity that is of channels that can be received in the first time interval and that corresponds to the carrier quantity.

Optionally, the at least one type of quantity that is of RBs and that corresponds to the quantity of channels that can be received in the first time is in a one-to-one correspondence with the at least one type of carrier quantity, and a larger carrier quantity indicates a larger quantity that is of RBs and that corresponds to the quantity of channels that can be received in the first time interval and corresponds to the carrier quantity.

Optionally, the quantity of channels that can be received in the first time interval is strictly or approximately in direct proportion to the carrier quantity.

For example, for terminal devices with different reception capabilities defined in the protocol, a same carrier quantity corresponds to different quantities of channels that can be received in the first time interval, or different quantities that are of RBs and that correspond to quantities of channels that can be received in the first time interval.

In an example, in case of a 15 KHz subcarrier spacing, Table 12 shows quantities of channels that can be detected by terminal devices with two different reception capabilities. As shown in Table 12, the at least one type of carrier quantity is, for example, 2/3/4/5. In Table 12, a column in which B1 is located indicates quantities that are of channels that can be received in the first time interval, that correspond to different carrier quantities, and that exist when the reception capability is 1, and a column in which B2 is located indicates quantities that are of channels that can be received in the first time interval, that correspond to different carrier quantities, and that exist when the reception capability is 2.

TABLE 12

| Carrier quantity | B1 | B2 |
| --- | --- | --- |
| 2 | 10 | 20 |
| 3 | 15 | 30 |
| 4 | 20 | 40 |
| 5 | 25 | 50 |

Therefore, in this embodiment of this application, the first terminal apparatus, namely, a receive-end device, may determine, in a predefined manner (for example, Table 12) based on the carrier quantity and a capability type (for example, the reception capability 1 or the reception capability 2) supported by the first terminal apparatus, the quantity that is of channels that can be received in the first time interval and that is supported by the first terminal apparatus, so that the receive-end device determines, based on the carrier quantity, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the carrier combination belongs to at least one type of carrier combination. In this case, the at least one type of quantity of channels that can be received in the first time interval is in a one-to-one correspondence with the at least one type of carrier combination, and a larger total bandwidth of the carrier combination indicates a larger quantity that is of channels that can be received in the first time interval and that corresponds to the carrier combination.

Optionally, the at least one type of quantity that is of RBs and that corresponds to the quantity of channels that can be received in the first time is in a one-to-one correspondence with the at least one type of carrier combination, and a larger total bandwidth of the carrier combination indicates a larger quantity that is of RBs and that corresponds to the quantity of channels that can be received in the first time interval and corresponds to the carrier combination.

For example, for terminal devices with different reception capabilities defined in the protocol, a same carrier combination corresponds to different quantities of channels that can be received in the first time interval, or different quantities that are of RBs and that correspond to quantities of channels that can be received in the first time interval.

For example, in case of a 15 KHz subcarrier spacing, Table 13 shows quantities of channels that can be detected by terminal devices with two different reception capabilities. As shown in Table 13, the at least one type of carrier combination is, for example, {10 MHz+10 MHz}, {10 MHz+20 MHz}, {10 MHz+30 MHz}, {20 MHz+20 MHz}, {10 MHz+40 MHz}, {20 MHz+40 MHz}, {30 MHz+30 MHz}, {50 MHz+10 MHz}, {50 MHz+20 MHz}, or {40 MHz+30 MHz}. In Table 13, a column in which B1 is located indicates quantities that are of channels that can be received in the first time interval, that correspond to different carrier combinations, and that exist when the reception capability is 1, and a column in which B2 is located indicates quantities that are of channels that can be received in the first time interval, that correspond to different carrier combinations, and that exist when the reception capability is 2.

TABLE 13

| Carrier combination | B1 | B2 |
| --- | --- | --- |
| {10 MHz + 10 MHz} | 20 | 40 |
| {10 MHz + 20 MHz} | 25 | 50 |
| {10 MHz + 30 MHz} | 40 | 80 |
| {20 MHz + 20 MHz} | 40 | 80 |
| {10 MHz + 40 MHz} | 50 | 100 |
| {20 MHz + 40 MHz} | 60 | 120 |
| {30 MHz + 30 MHz} | 60 | 120 |
| {50 MHz + 10 MHz} | 60 | 120 |
| {50 MHz + 20 MHz} | 70 | 140 |
| {40 MHz + 30 MHz} | 70 | 140 |

Therefore, in this embodiment of this application, the first terminal apparatus, namely, a receive-end device, may determine, in a predefined manner (for example, Table 13) based on the carrier combination and a capability type (for example, the reception capability 1 or the reception capability 2) supported by the first terminal apparatus, the quantity that is of channels that can be received in the first time interval and that is supported by the first terminal apparatus, so that the receive-end device determines, based on the carrier combination, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the spatial layer quantity belongs to at least one type of spatial layer quantity. In this case, the at least one type of quantity of channels that can be received in the first time interval is in a one-to-one correspondence with the at least one type of spatial layer quantity, and a larger spatial layer quantity indicates a larger quantity that is of channels that can be received in the first time interval and that corresponds to the spatial layer quantity.

Optionally, the at least one type of quantity that is of RBs and that corresponds to the quantity of channels that can be received in the first time is in a one-to-one correspondence with the at least one type of spatial layer quantity, and a larger spatial layer quantity indicates a larger quantity that is of RBs and that corresponds to the quantity of channels that can be received in the first time interval and corresponds to the spatial layer quantity.

Optionally, the quantity of channels that can be received in the first time interval is strictly or approximately in direct proportion to the spatial layer quantity.

For example, for terminal devices with different reception capabilities defined in the protocol, a same spatial layer quantity corresponds to different quantities of channels that can be received in the first time interval, or different quantities that are of RBs and that correspond to quantities of channels that can be received in the first time interval.

For example, in case of a 20 MHz bandwidth, Table 14 shows quantities of channels that can be detected by terminal devices with two different reception capabilities. As shown in Table 14, the at least one type of spatial layer quantity is, for example, 1/2/3/4. In Table 14, a column in which B1 is located indicates quantities that are of channels that can be received in the first time interval, that correspond to different spatial layer quantities, and that exist when the reception capability is 1, and a column in which B2 is located indicates quantities that are of channels that can be received in the first time interval, that correspond to different spatial layer quantities, and that exist when the reception capability is 2.

TABLE 14

| Spatial layer quantity | B1 | B2 |
|---|---|---|
| 1 | 10 | 20 |
| 2 | 6 | 12 |
| 3 | 2 | 6 |
| 4 | 1 | 3 |

Therefore, in this embodiment of this application, the first terminal apparatus, namely, a receive-end device, may determine, in a predefined manner (for example, Table 1) based on the spatial layer quantity and a capability type (for example, the reception capability 1 or the reception capability 2) supported by the first terminal apparatus, the quantity that is of channels that can be received in the first time interval and that is supported by the first terminal apparatus, so that the receive-end device determines, based on the spatial layer quantity, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible implementations, the maximum quantity of received bits belongs to at least one type of maximum quantity of received bits.

In some possible cases, the reception type class belongs to at least one type of reception type class. In this case, the at least one type of maximum quantity of received bits is in a one-to-one correspondence with the at least one type of reception type class, and a higher reception type class indicates a larger maximum quantity that is of received bits and that corresponds to the reception type class.

For example, for terminal devices with different reception capabilities defined in the protocol, a same reception type class corresponds to different maximum quantities of received bits.

In an example, in case of a 20 MHz bandwidth, Table 15 shows maximum quantities of received bits of terminal devices with two different reception capabilities. As shown in Table 15, the at least one type of reception type class is, for example, 1/2/3/4. In Table 15, a column in which C1 is located indicates maximum quantities that are of received bits of the terminal device, that correspond to different reception type classes, and that exist when the reception capability is 1, and a column in which C2 is located indicates maximum quantities that are of received bits of the terminal device, that correspond to different reception type classes, and that exist when the reception capability is 2.

TABLE 15

| Reception type class | C1 | C2 |
|---|---|---|
| 1 | 25456 | 31704 |
| 2 | 2*25456 | 2*31704 |
| 3 | 3*25456 | 3*31704 |
| 4 | 4*25456 | 4*31704 |

Therefore, in this embodiment of this application, the first terminal apparatus, namely, a receive-end device, may determine the maximum quantity of received bits of the first terminal apparatus in a predefined manner (for example, Table 15) based on the reception type class and a capability type (for example, the reception capability 1 or the reception capability 2) supported by the first terminal apparatus, so that the receive-end device determines, based on the reception type class, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the bandwidth size belongs to at least one type of bandwidth size. In this case, the at least one type of maximum quantity of received bits is in a one-to-one correspondence with the at least one type of bandwidth size, and a larger bandwidth size indicates a larger maximum quantity that is of received bits that can be received in the first time interval and that corresponds to the bandwidth size.

Optionally, the maximum quantity of received bits is strictly or approximately in direct proportion to the bandwidth size.

For example, for terminal devices with different reception capabilities defined in the protocol, a same bandwidth size corresponds to different maximum quantities of received bits.

In an example, in case of a 15 KHz subcarrier spacing, Table 16 shows maximum quantities of received bits of terminal devices with two different reception capabilities. As shown in Table 16, the at least one type of bandwidth size is, for example, 10 MHz/20 MHz/30 MHz/40 MHz/50 MHz/60 MHz/70 MHz. In Table 16, a column in which C1 is located indicates maximum quantities that are of received bits of the terminal device, that correspond to different bandwidth sizes, and that exist when the capability is 1, and a column in which C2 is located indicates maximum quantities that are of received bits of the terminal device, that correspond to different bandwidth sizes, and that exist when the capability is 2.

TABLE 16

| Bandwidth size (MHz) | C1 | C2 |
| --- | --- | --- |
| 10 | 25456 | 31704 |
| 20 | 2*25456 | 2*31704 |
| 30 | 3*25456 | 3*31704 |
| 40 | 4*25456 | 4*31704 |
| 50 | 5*25456 | 5*31704 |
| 60 | 6*25456 | 6*31704 |
| 70 | 7*25456 | 7*31704 |

Therefore, in this embodiment of this application, the first terminal apparatus, namely, a receive-end device, may determine the maximum quantity of received bits of the first terminal apparatus in a predefined manner (for example, Table 16) based on the bandwidth size and a capability type (for example, the reception capability 1 or the reception capability 2) supported by the first terminal apparatus, so that the receive-end device determines, based on the bandwidth size, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the carrier quantity belongs to at least one type of carrier quantity. In this case, the at least one type of maximum quantity of received bits is in a one-to-one correspondence with the at least one type of carrier quantity, and a larger carrier quantity indicates a larger maximum quantity that is of received bits and that corresponds to the carrier quantity.

Optionally, the maximum quantity of received bits is strictly or approximately in direct proportion to the carrier quantity.

For example, for terminal devices with different reception capabilities defined in the protocol, a same carrier quantity corresponds to different maximum quantities of received bits.

In an example, in case of a 15 KHz subcarrier spacing, Table 17 shows maximum quantities of received bits of terminal devices with two different reception capabilities. As shown in Table 17, the at least one type of carrier quantity is, for example, 2/3/4/5. In Table 17, a column in which C1 is located indicates maximum quantities that are of received bits of the terminal device, that correspond to different carrier quantities, and that exist when the reception capability is 1, and a column in which C2 is located indicates maximum quantities that are of received bits of the terminal device, that correspond to different carrier quantities, and that exist when the reception capability is 2.

TABLE 17

| Carrier quantity | C1 | C2 |
| --- | --- | --- |
| 2 | 25456 | 31704 |
| 3 | 12728 | 15852 |
| 4 | 6364 | 7926 |
| 5 | 3182 | 3963 |

Therefore, in this embodiment of this application, the first terminal apparatus, namely, a receive-end device, may determine the maximum quantity of received bits of the first terminal apparatus in a predefined manner (for example, Table 17) based on the carrier quantity and a capability type (for example, the reception capability 1 or the reception capability 2) supported by the first terminal apparatus, so that the receive-end device determines, based on the carrier quantity, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In a possible case, the carrier combination belongs to at least one type of carrier combination. In this case, the at least one type of maximum quantity of received bits is in a one-to-one correspondence with the at least one type of carrier combination, and a larger total bandwidth of the carrier combination indicates a larger maximum quantity that is of received bits and that corresponds to the carrier combination.

For example, for terminal devices with different reception capabilities defined in the protocol, a same carrier combination corresponds to different maximum quantities of received bits.

In an example, in case of a 15 KHz subcarrier spacing, Table 18 shows maximum quantities of received bits of terminal devices with two different reception capabilities. As shown in Table 18, the at least one type of carrier combination is, for example, {10 MHz+10 MHz}, {10 MHz+20 MHz}, {10 MHz+30 MHz}, {20 MHz+20 MHz}, {10 MHz+40 MHz}, {20 MHz+40 MHz}, {30 MHz+30 MHz}, {50 MHz+10 MHz}, {50 MHz+20 MHz}, or {40 MHz+30 MHz}. In Table 18, a column in which C1 is located indicates maximum quantities that are of received bits of the terminal device, that correspond to different carrier combinations, and that exist when the reception capability is 1, and a column in which C2 is located indicates maximum quantities that are of received bits of the terminal device, that correspond to different carrier combinations, and that exist when the reception capability is 2.

TABLE 18

| Carrier combination | C1 | C2 |
| --- | --- | --- |
| {10 MHz + 10 MHz} | 2*25456 | 2*31704 |
| {10 MHz + 20 MHz} | 3*25456 | 3*31704 |
| {20 MHz + 10 MHz} | 3*25456 | 3*31704 |
| {30 MHz + 10 MHz} | 4*25456 | 4*31704 |
| {20 MHz + 20 MHz} | 4*25456 | 4*31704 |
| {40 MHz + 10 MHz} | 5*25456 | 5*31704 |
| {40 MHz + 20 MHz} | 6*25456 | 6*31704 |
| {30 MHz + 30 MHz} | 6*25456 | 6*31704 |
| {50 MHz + 10 MHz} | 6*25456 | 6*31704 |
| {50 MHz + 20 MHz} | 7*25456 | 7*31704 |
| {40 MHz + 30 MHz} | 7*25456 | 7*31704 |

Therefore, in this embodiment of this application, the first terminal apparatus, namely, a receive-end device, may determine the maximum quantity of received bits of the first terminal apparatus in a predefined manner (for example, Table 18) based on the carrier combination and a capability type (for example, the reception capability 1 or the reception capability 2) supported by the first terminal apparatus, so that the receive-end device determines, based on the carrier combination, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the spatial layer quantity belongs to at least one type of spatial layer quantity. In this case, the at least one type of maximum quantity of received bits is in a one-to-one correspondence with the at least one type of spatial layer quantity, and a larger spatial layer quantity indicates a larger maximum quantity that is of received bits and that corresponds to the spatial layer quantity.

Optionally, the maximum quantity of received bits is strictly or approximately in direct proportion to the spatial layer quantity.

For example, for terminal devices with different reception capabilities defined in the protocol, a same spatial layer quantity corresponds to different maximum quantities of received bits.

For example, in case of a 20 MHz bandwidth, Table 19 shows maximum quantities of received bits of terminal devices with two different reception capabilities. As shown in Table 19, the at least one type of spatial layer quantity is, for example, 1/2/3/4. In Table 19, a column in which C1 is located indicates maximum quantities that are of received bits of the terminal device, that correspond to different spatial layer quantities, and that exist when the reception capability is 1, and a column in which C2 is located indicates maximum quantities that are of received bits of the terminal device, that correspond to different spatial layer quantities, and that exist when the reception capability is 2.

TABLE 19

| Spatial layer quantity | C1 | C2 |
| --- | --- | --- |
| 1 | 25456 | 31704 |
| 2 | 2*25456 | 2*31704 |
| 3 | 3*25456 | 3*31704 |
| 4 | 4*25456 | 4*31704 |

Therefore, in this embodiment of this application, the first terminal apparatus, namely, a receive-end device, may determine the maximum quantity of received bits of the first terminal apparatus in a predefined manner (for example, Table 19) based on the spatial layer quantity and a capability type (for example, the reception capability 1 or the reception capability 2) supported by the first terminal apparatus, so that the receive-end device determines, based on the spatial layer quantity, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible implementations, the maximum quantity of transmitted bits belongs to at least one type of maximum quantity of transmitted bits.

In some possible cases, the transmission type class belongs to at least one type of transmission type class. In this case, the at least one type of maximum quantity of transmitted bits is in a one-to-one correspondence with the at least one type of transmission type class, and a higher transmission type class indicates a larger maximum quantity that is of transmitted bits and that corresponds to the transmission type class.

For example, for terminal devices with different transmission capabilities defined in the protocol, a same reception type class corresponds to different maximum quantities of received bits.

In an example, in case of a 20 MHz bandwidth, Table 20 shows maximum quantities of transmitted bits of terminal devices with two different transmission capabilities. As shown in Table 20, the at least one type of reception type class is, for example, 1/2/3/4. In Table 20, a column in which D1 is located indicates maximum quantities that are of transmitted bits of the terminal device, that correspond to different reception type classes, and that exist when the transmission capability is 1, and a column in which D2 is located indicates maximum quantities that are of transmitted bits of the terminal device, that correspond to different reception type classes, and that exist when the transmission capability is 2.

TABLE 20

| Reception type class | D1 | D2 |
| --- | --- | --- |
| 1 | 25456 | 31704 |
| 2 | 2*25456 | 2*31704 |
| 3 | 3*25456 | 3*31704 |
| 4 | 4*25456 | 4*31704 |

Therefore, in this embodiment of this application, the first terminal apparatus, namely, a transmit-end device, may determine the maximum quantity of transmitted bits of the first terminal apparatus in a predefined manner (for example, Table 20) based on the reception type class and a capability type (for example, the transmission capability 1 or the transmission capability 2) supported by the first terminal apparatus, so that the transmit-end device determines, based on the reception type class, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

In some possible cases, the bandwidth size belongs to at least one type of bandwidth size. In this case, the at least one type of maximum quantity of transmitted bits is in a one-to-one correspondence with the at least one type of bandwidth size, and a larger bandwidth size indicates a larger maximum quantity that is of transmitted bits and that corresponds to the bandwidth size.

Optionally, the maximum quantity of transmitted bits is strictly or approximately in direct proportion to the bandwidth size.

For example, for terminal devices with different transmission capabilities defined in the protocol, a same bandwidth size corresponds to different maximum quantities of transmitted bits.

In an example, in case of a 15 KHz subcarrier spacing, Table 21 shows maximum quantities of transmitted bits of terminal devices with two different reception capabilities. As shown in Table 21, the at least one type of bandwidth size is, for example, 20 MHz/30 MHz/40 MHz/50 MHz/60 MHz/70 MHz. In Table 21, a column in which D1 is located indicates maximum quantities that are of transmitted bits of the terminal device, that correspond to different bandwidth sizes, and that exist when the transmission capability is 1, and a column in which D2 is located indicates maximum quantities that are of transmitted bits of the terminal device, that correspond to different bandwidth sizes, and that exist when the transmission capability is 2.

TABLE 21

| Bandwidth size (MHz) | D1 | D2 |
|---|---|---|
| 20 | 2*25456 | 2*31704 |
| 30 | 3*25456 | 3*31704 |
| 40 | 4*25456 | 4*31704 |
| 50 | 5*25456 | 5*31704 |
| 60 | 6*25456 | 6*31704 |
| 70 | 7*25456 | 7*31704 |

Therefore, in this embodiment of this application, the first terminal apparatus, namely, a transmit-end device, may determine the maximum quantity of transmitted bits of the first terminal apparatus in a predefined manner (for example, Table 21) based on the bandwidth size and a capability type (for example, the transmission capability 1 or the transmission capability 2) supported by the first terminal apparatus, so that the transmit-end device determines, based on the bandwidth size, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

In some possible cases, the carrier quantity belongs to at least one type of carrier quantity. In this case, the at least one type of maximum quantity of transmitted bits is in a one-to-one correspondence with the at least one type of carrier quantity, and a larger carrier quantity indicates a larger maximum quantity that is of transmitted bits and that corresponds to the carrier quantity.

Optionally, the maximum quantity of transmitted bits is strictly or approximately in direct proportion to the carrier quantity.

For example, for terminal devices with different transmission capabilities defined in the protocol, a same carrier quantity corresponds to different maximum quantities of transmitted bits.

In an example, in case of a 15 KHz subcarrier spacing, Table 22 shows maximum quantities of transmitted bits of terminal devices with two different transmission capabilities. As shown in Table 22, the at least one type of carrier quantity is, for example, 2/3/4/5. In Table 22, a column in which D1 is located indicates maximum quantities that are of transmitted bits of the terminal device, that correspond to different carrier quantities, and that exist when the transmission capability is 1 and a column in which D2 is located indicates maximum quantities that are of transmitted bits of the terminal device, that correspond to different carrier quantities, and that exist when the transmission capability is 2.

TABLE 22

| Carrier quantity | D1 | D2 |
|---|---|---|
| 2 | 25456 | 31704 |
| 3 | 2*25456 | 2*31704 |

TABLE 22-continued

| Carrier quantity | D1 | D2 |
|---|---|---|
| 4 | 3*25456 | 3*31704 |
| 5 | 4*25456 | 4*31704 |

Therefore, in this embodiment of this application, the first terminal apparatus, namely, a transmit-end device, may determine the maximum quantity of transmitted bits of the first terminal apparatus in a predefined manner (for example, Table 22) based on the carrier quantity and a capability type (for example, the transmission capability 1 or the transmission capability 2) supported by the first terminal apparatus, so that the transmit-end device determines, based on the carrier quantity, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

In some possible cases, the carrier combination belongs to at least one type of carrier combination. In this case, the at least one type of maximum quantity of transmitted bits is in a one-to-one correspondence with the at least one type of carrier combination, and a larger total bandwidth of the carrier combination indicates a larger maximum quantity that is of transmitted bits and that corresponds to the carrier combination.

For example, for terminal devices with different transmission capabilities defined in the protocol, a same carrier combination corresponds to different maximum quantities of transmitted bits.

In an example, in case of a 15 KHz subcarrier spacing, Table 23 shows maximum quantities of transmitted bits of terminal devices with two different transmission capabilities. As shown in Table 23, the at least one type of carrier combination is, for example, {10 MHz+10 MHz}, {10 MHz+20 MHz}, {10 MHz+30 MHz}, {20 MHz+20 MHz}, {10 MHz+40 MHz}, {20 MHz+40 MHz}, {30 MHz+30 MHz}, {50 MHz+10 MHz}, {50 MHz+20 MHz}, or {40 MHz+30 MHz}. In Table 23, a column in which D1 is located indicates maximum quantities that are of transmitted bits of the terminal device, that correspond to different carrier combinations, and that exist when the transmission capability is 1 and a column in which D2 is located indicates maximum quantities that are of transmitted bits of the terminal device, that correspond to different carrier combinations, and that exist when the transmission capability is 2.

TABLE 23

| Carrier combination | D1 | D2 |
|---|---|---|
| {10 MHz + 10 MHz} | 2*25456 | 2*31704 |
| {10 MHz + 20 MHz} | 3*25456 | 3*31704 |
| {20 MHz + 10 MHz} | 3*25456 | 3*31704 |
| {30 MHz + 10 MHz} | 4*25456 | 4*31704 |
| {20 MHz + 20 MHz} | 4*25456 | 4*31704 |
| {40 MHz + 10 MHz} | 5*25456 | 5*31704 |
| {40 MHz + 20 MHz} | 6*25456 | 6*31704 |
| {30 MHz + 30 MHz} | 6*25456 | 6*31704 |
| {50 MHz + 10 MHz} | 6*25456 | 6*31704 |
| {50 MHz + 20 MHz} | 7*25456 | 7*31704 |
| {40 MHz + 30 MHz} | 7*25456 | 7*31704 |

Therefore, in this embodiment of this application, the first terminal apparatus, namely, a transmit-end device, may determine the maximum quantity of transmitted bits of the first terminal apparatus in a predefined manner (for example, Table 23) based on the carrier combination and a capability type (for example, the transmission capability 1 or the transmission capability 2) supported by the first terminal apparatus, so that the transmit-end device determines, based on the carrier combination, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

In some possible cases, the spatial layer quantity belongs to at least one type of spatial layer quantity. In this case, the at least one type of maximum quantity of transmitted bits is in a one-to-one correspondence with the at least one type of spatial layer quantity, and a larger spatial layer quantity indicates a larger maximum quantity that is of transmitted bits and that corresponds to the spatial layer quantity.

Optionally, the maximum quantity of transmitted bits is strictly or approximately in direct proportion to the spatial layer quantity.

For example, for terminal devices with different transmission capabilities defined in the protocol, a same spatial layer quantity corresponds to different maximum quantities of transmitted bits.

For example, in case of a 20 MHz bandwidth, Table 24 shows maximum quantities of transmitted bits of terminal devices with two different transmission capabilities. As shown in Table 24, the at least one type of spatial layer quantity is, for example, 1/2/3/4. In Table 24, a column in which D1 is located indicates maximum quantities that are of transmitted bits of the terminal device, that correspond to different spatial layer quantities, and that exist when the transmission capability is 1, and a column in which D2 is located indicates maximum quantities that are of transmitted bits of the terminal device, that correspond to different spatial layer quantities, and that exist when the transmission capability is 2.

TABLE 24

| Spatial layer quantity | D1 | D2 |
| --- | --- | --- |
| 1 | 25456 | 31704 |
| 2 | 2*25456 | 2*31704 |
| 3 | 3*25456 | 3*31704 |
| 4 | 4*25456 | 4*31704 |

Therefore, in this embodiment of this application, the first terminal apparatus, namely, a transmit-end device, may determine the maximum quantity of transmitted bits of the first terminal apparatus in a predefined manner (for example, Table 24) based on the spatial layer quantity and a capability type (for example, the transmission capability 1 or the transmission capability 2) supported by the first terminal apparatus, so that the transmit-end device determines, based on the spatial layer quantity, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

In this embodiment of this application, the first terminal apparatus can determine the reception capability parameter and/or the transmission capability parameter based on the first parameter and at least one of the reception type class, the bandwidth size, the carrier quantity or the carrier combination, and the spatial layer quantity. In this way, when signals sent by many other terminal devices arrive at the receiver of the first terminal apparatus, the first terminal apparatus can demodulate all data packets that may arrive at the receiver of the terminal device, to help reduce, as much as possible, a loss caused because some undetected data packets are missed, and help achieve an optimal balance point between a cost and performance of the terminal.

In some possible implementations, the first terminal apparatus may determine, based on the first parameter and one or more of the following parameters, the quantity of channels that can be received in the first time interval:

a demodulation reference signal pattern; and the maximum quantity of received bits.

In some possible implementations, the quantity of channels that can be received in the first time interval belongs to at least one type of quantity of channels that can be received in the first time interval.

In some possible cases, the demodulation reference signal pattern belongs to at least one type of demodulation reference signal pattern. In this case, the at least one type of quantity of channels that can be received in the first time interval is in a one-to-one correspondence with the at least one type of demodulation reference signal pattern, and when the demodulation reference signal pattern is a pattern that occupies a larger quantity of symbols, the quantity that is of channels that can be received in the first time interval and that corresponds to the demodulation reference signal pattern is smaller.

For example, for terminal devices with different reception capabilities defined in the protocol, a same demodulation reference signal pattern corresponds to different quantities of channels that can be received in the first time interval.

In an example, in case of a 20 MHz bandwidth, Table 25 shows quantities of channels that can be detected by terminal devices with two different reception capabilities. As shown in Table 25, the at least one type of demodulation reference signal pattern is, for example, a pattern 1/2/3/4. In Table 25, a column in which D1 is located indicates quantities that are of channels that can be received in the first time interval, that correspond to different demodulation reference signal patterns, and that exist when the capability is 1, and a column in which D2 is located indicates quantities that are of channels that can be received in the first time interval, that correspond to different demodulation reference signal patterns, and that exist when the capability is 2.

TABLE 25

| Demodulation reference signal pattern | B1 | B2 |
| --- | --- | --- |
| Pattern 1 | 10 | 20 |
| Pattern 2 | 6 | 12 |
| Pattern 3 | 6 | 12 |
| Pattern 4 | 6 | 12 |

Therefore, in this embodiment of this application, the first terminal apparatus, namely, a receive-end device, may determine, in a predefined manner (for example, Table 25) based on the received demodulation reference signal pattern and a capability type (for example, the reception capability 1 or the reception capability 2) supported by the first terminal apparatus, the quantity that is of channels that can be received in the first time interval and that is supported by the first terminal apparatus, so that the receive-end device determines, based on the demodulation reference signal pattern, a reception capability value (namely, the quantity of channels that can be received in the first time interval) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible cases, the maximum quantity of received bits belongs to at least one type of maximum quantity of received bits. In this case, the at least one type of quantity of channels that can be received in the first time interval is in a one-to-one correspondence with the at least one type of maximum quantity of received bits, and a larger maximum quantity of received bits indicates a larger quantity that is of channels that can be received in the first time interval and that corresponds to the maximum quantity of received bits.

Optionally, the quantity of channels that can be received in the first time interval is strictly or approximately in direct proportion to the maximum quantity of received bits.

For example, for terminal devices with different reception capabilities defined in the protocol, a same maximum quantity of received bits corresponds to different quantities of channels that can be received in the first time interval.

In this embodiment of this application, the first terminal apparatus can determine the reception capability parameter based on the first parameter and at least one of the demodulation reference signal pattern and the maximum quantity of received bits. In this way, when signals sent by many other terminal devices arrive at the receiver of the first terminal apparatus, the first terminal apparatus can demodulate all data packets that may arrive at the receiver of the terminal device, to help reduce, as much as possible, a loss caused because some undetected data packets are missed, and help achieve an optimal balance point between a cost and performance of the terminal.

In some possible implementations, the first terminal apparatus may determine the maximum quantity of received bits based on the first parameter and a modulation scheme.

In some possible implementations, the maximum quantity of received bits belongs to at least one type of maximum quantity of received bits.

In some possible cases, the modulation scheme belongs to at least one type of modulation scheme. In this case, the at least one type of modulation scheme is in a one-to-one correspondence with the at least one type of maximum quantity of received bits, and a higher modulation scheme indicates a larger maximum quantity that is of received bits and that corresponds to the modulation scheme.

For example, for terminal devices with different reception capabilities defined in the protocol, a same modulation scheme corresponds to different maximum quantities of received bits.

For example, in case of a 20 MHz bandwidth, Table 27 shows maximum quantities of received bits of terminal devices with two different reception capabilities. As shown in Table 27, the at least one type of modulation scheme is, for example, quadrature phase shift keying (QPSK)/16 quadrature amplitude modulation (QAM)/64QAM/256QAM. In Table 27, a column in which C1 is located indicates maximum quantities that are of received bits of the terminal device, that correspond to different received modulation schemes, and that exist when the reception capability is 1, and a column in which C2 is located indicates maximum quantities that are of received bits of the terminal device, that correspond to different modulation schemes, and that exist when the reception capability is 2.

TABLE 27

| Modulation scheme | C1 | C2 |
| --- | --- | --- |
| QPSK | 25456 | 31704 |
| 16QAM | 2*25456 | 2*31704 |
| 64QAM | 4*25456 | 4*31704 |
| 256QAM | 8*25456 | 8*31704 |

Therefore, in this embodiment of this application, the first terminal apparatus, namely, a receive-end device, may determine the maximum quantity of received bits of the first terminal apparatus in a predefined manner (for example, Table 27) based on the modulation scheme and a capability type (for example, the reception capability 1 or the reception capability 2) supported by the first terminal apparatus, so that the receive-end device determines, based on the modulation scheme, a reception capability value (namely, the maximum quantity of received bits) corresponding to a corresponding reception capability of the receive-end device. In this way, when producing a corresponding device, an equipment vendor can design a corresponding architecture, calculation capability, power consumption, and device cost based on the reception capability value, to achieve a good balance between a cost and performance based on a corresponding capability.

In some possible implementations, the first terminal apparatus may determine the maximum quantity of transmitted bits based on the first parameter and a modulation scheme.

In some possible implementations, the maximum quantity of transmitted bits belongs to at least one type of maximum quantity of transmitted bits.

In some possible cases, the modulation scheme belongs to at least one type of modulation scheme. In this case, the at least one type of modulation scheme is in a one-to-one correspondence with the at least one type of maximum quantity of transmitted bits, and a higher modulation scheme indicates a larger maximum quantity that is of transmitted bits and that corresponds to the modulation scheme.

For example, for terminal devices with different transmission capabilities defined in the protocol, a same modulation scheme corresponds to different maximum quantities of transmitted bits.

For example, Table 28 shows maximum quantities of transmitted bits of terminal devices with two different transmission capabilities. As shown in Table 28, the at least one type of modulation scheme is, for example, QPSK/16QAM/64QAM/256QAM. In Table 28, a column in which D1 is located indicates maximum quantities that are of transmitted bits of the terminal device, that correspond to different modulation schemes, and that exist when the transmission capability is 1, and a column in which D2 is located indicates maximum quantities that are of transmitted bits of the terminal device, that correspond to different modulation schemes, and that exist when the transmission capability is 2.

TABLE 28

| Modulation scheme | D1 | D2 |
|---|---|---|
| QPSK | 25456 | 31704 |
| 16QAM | 2*25456 | 2*31704 |
| 64QAM | 4*25456 | 4*31704 |
| 256QAM | 8*25456 | 8*31704 |

Therefore, in this embodiment of this application, the first terminal apparatus, namely, a transmit-end device, may determine the maximum quantity of transmitted bits of the first terminal apparatus in a predefined manner (for example, Table 28) based on the modulation scheme and a capability type (for example, the transmission capability 1 or the transmission capability 2) supported by the first terminal apparatus, so that the transmit-end device determines, based on the modulation scheme, a transmission capability value (namely, the maximum quantity of transmitted bits) corresponding to a corresponding transmission capability of the transmit-end device. In this way, when producing a corresponding device, an equipment vendor can design a corresponding architecture, calculation capability, power consumption, and device cost based on the transmission capability value, to achieve a good balance between a cost and performance based on a corresponding capability.

In some optional embodiments, when the first terminal apparatus supports both a cellular link and a sidelink, a total maximum quantity of received bits and a combination of a maximum quantity of received bits used for the cellular link and a maximum quantity of received bits used for the sidelink may be defined for the first terminal apparatus.

In some optional embodiments, when the first terminal apparatus supports both a cellular link and a sidelink, a total maximum quantity of transmitted bits and a combination of a maximum quantity of transmitted bits used for the cellular link and a maximum quantity of transmitted bits used for the sidelink may be defined for the first terminal apparatus.

In some optional embodiments, the maximum quantity of processes, the quantity of channels that can be received in the first time interval, the maximum quantity of received bits, or the maximum quantity of transmitted bits may be separately defined for unicast and multicast, where the quantity is supported by the terminal device.

In some optional embodiments, different quantities of channels that can be received in the first time interval, different maximum quantities of received bits, or different maximum quantities of transmitted bits may be configured for different maximum quantities of retransmission times in HARQ-based transmission. For example, when the maximum quantity of retransmission times in HARQ transmission is 32, the quantity of channels that can be received in the first time interval is N1; or when the maximum quantity of retransmission times in HARQ transmission is 16, the quantity of channels that can be received in the first time interval is N2, where N1 and N2 are respectively positive integers, and N2 is greater than N1.

S320. The first terminal apparatus performs sidelink transmission based on the reception capability parameter and/or the transmission capability parameter.

For example, when the first terminal apparatus receives sidelink data based on the quantity of channels that can be received in the first time interval, a quantity of channels that can be received in the first time interval is less than or equal to the quantity that is of channels that can be received in the first time interval and that is indicated in the reception capability parameter. Alternatively, when the first terminal apparatus receives sidelink data based on the maximum quantity of received bits, a quantity of bits that can be received is less than or equal to the maximum quantity that is of received bits and that is indicated in the reception capability parameter. Alternatively, when the first terminal apparatus sends sidelink data based on the maximum quantity of transmitted bits, a quantity of bits that can be transmitted is less than or equal to the maximum quantity that is of transmitted bits and that is indicated in the transmission capability parameter.

Therefore, in this embodiment of this application, when signals sent by many other terminal devices arrive at the receiver of the first terminal apparatus, the first terminal apparatus can demodulate, as much as possible, all data packets that may arrive at the receiver of the terminal device, to reduce, as much as possible, a loss caused because some undetected data packets are missed, and achieve an optimal balance point between a cost and performance of the terminal.

When a buffer of the first terminal apparatus is full and/or when a quantity of channels received by the first terminal apparatus reaches a maximum value, the first terminal apparatus may perform any one of the following processing:

the first terminal apparatus discards a process that is indicated in control information in received data and whose priority is lower than a preset priority, or data corresponding to the control information;

the first terminal apparatus discards a process or data whose distance to the first terminal apparatus is greater than a preset distance or exceeds a minimum communication distance required by a corresponding data packet;

the first terminal apparatus discards a to-be-received process or to-be-received data that is blindly transmitted;

the first terminal apparatus discards a to-be-received synchronization signal;

when to-be-transmitted data is transmitted in a HARQ manner, the first terminal apparatus discards data whose quantity of retransmission times exceeds a preset quantity of times, or when to-be-received data is transmitted in a HARQ manner, the first terminal apparatus discards data whose quantity of retransmission times exceeds a preset quantity of times; and the first terminal apparatus determines, based on a transmission type, to discard to-be-received data, where the transmission type includes unicast, multicast, or broadcast.

Therefore, in this embodiment of this application, when data corresponding to a quantity of channels received by the first terminal apparatus in the first time interval is greater than a maximum buffer of the first terminal apparatus, a specified type of data or some types of data may be discarded according to the foregoing rule, so that a system performance loss can be reduced.

When a buffer of the first terminal apparatus is full and/or when a quantity of transmission users of the first terminal apparatus reaches a maximum quantity of users, the first terminal apparatus performs any one of the following processing:

the first terminal apparatus discards data that is in to-be-sent data and whose priority is lower than a preset priority;

the first terminal apparatus discards a process or data whose distance to the first terminal apparatus is greater than a preset distance or exceeds a minimum communication distance required by a corresponding data packet;

the first terminal apparatus discards a to-be-sent process or data that is blindly transmitted;

the first terminal apparatus discards a to-be-sent synchronization signal;

when to-be-transmitted data is transmitted in a HARQ manner, the first terminal apparatus discards data whose quantity of retransmission times exceeds a preset quantity of times, or when to-be-received data is transmitted in a HARQ manner, the first terminal apparatus discards data whose quantity of retransmission times exceeds a preset quantity of times; and the first terminal apparatus determines, based on a transmission type, to discard to-be-sent data, where the transmission type includes unicast, multicast, or broadcast.

Therefore, in this embodiment of this application, when data corresponding to a quantity of channels sent by the first terminal apparatus in the first time interval is greater than a maximum buffer of the first terminal apparatus, a specified type of data or some types of data may be discarded according to the foregoing rule, so that a system performance loss can be reduced.

Optionally, in this embodiment of this application, the first terminal apparatus may further send first indication information to a second terminal apparatus, where the first indication information is used to indicate a reception capability parameter and/or a transmission capability parameter.

For example, the reception capability parameter and/or the transmission capability parameter may be the reception capability parameter and/or the transmission capability parameter of the first terminal apparatus, or may be a reception capability parameter and/or a transmission capability parameter that are/is received by the first terminal apparatus from a device other than the first terminal apparatus. This is not limited in this embodiment of this application.

In this embodiment of this application, the reception capability parameter and/or the transmission capability parameter are/is sent to the second terminal apparatus, so that the first terminal apparatus and the second terminal apparatus can communicate with each other based on a transmission capability parameter and/or a reception capability parameter of a peer device, and the first terminal apparatus and the second terminal apparatus communicate with each other within a corresponding reception capability and/or transmission capability. This helps prevent data from being lost because the reception capability and/or the transmission capability do/does not match during data transmission.

In the foregoing embodiments provided in this application, the method provided in the embodiments of this application is described. To implement functions in the method provided in the foregoing embodiment of this application, the first terminal apparatus may include a hardware structure and/or a software module, and implement the foregoing functions in a form of the hardware structure, the software module, or the hardware structure plus the software module. Whether a specific function in the foregoing functions is performed by using the hardware structure, the software module, or the combination of the hardware structure and the software module depends on particular application and design constrain conditions of the technical solutions.

The first terminal apparatus may be a network device, may be a terminal device, may be a chip applied to a network device or a terminal device, may be another combination device or component that has a function of the network device or the terminal device, or the like.

When the first terminal apparatus is a network device or a terminal device, a transceiver unit may be a receiver and a transmitter, and may include an antenna, a radio frequency circuit, and the like. A processing module may be a processor such as a baseband chip. The receiver and the transmitter may be an integrated transceiver or a discrete transceiver. This is not limited in the embodiments of this application.

When the first terminal apparatus is a component that has a function of the network device or the terminal, a transceiver module may be a radio frequency unit, and a processing module may be a processor.

When the first terminal apparatus is a chip system, a receiving module may be an input interface of the chip system, a processing module may be a processor of the chip system, for example, a central processing unit (CPU), and a sending module may be an output interface of the chip system.

Figure 4:
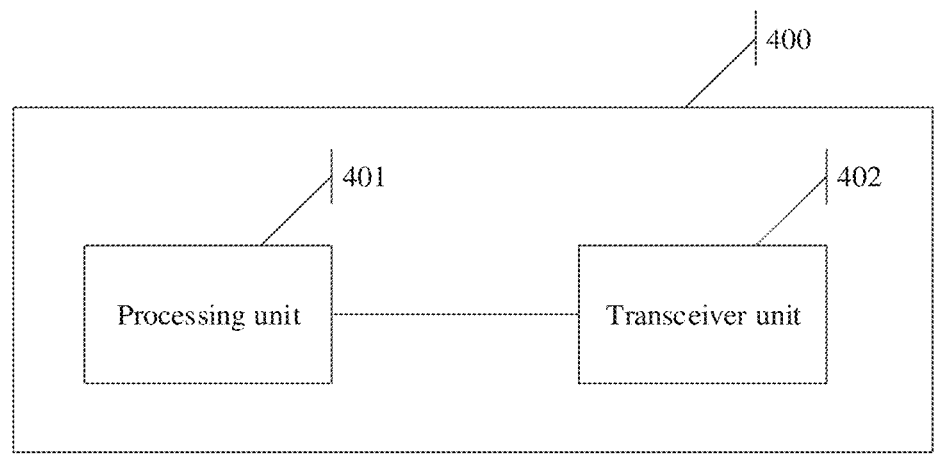
FIG. 4 is a schematic diagram of a communication apparatus according to an embodiment of this application.

FIG. 4 is a schematic diagram of a structure of a communication apparatus 400. The communication apparatus 400 may be a first terminal apparatus. For example, the communication apparatus 400 can implement a function of the first terminal apparatus in the method provided in the embodiments of this application. The communication apparatus 400 may be an apparatus that can support implementation of a function corresponding to the first terminal apparatus in the method provided in the embodiments of this application. The communication apparatus 400 may be a hardware structure, a software module, or a hardware structure plus a software module. The communication apparatus 400 may be implemented by a chip system. In embodiments of this application, the chip system may include a chip, or may include a chip and another discrete component.

The communication apparatus 400 may include a processing unit 401 and a transceiver unit 402.

The processing unit 401 may be configured to perform step S310 in the embodiment shown in FIG. 3, and/or configured to support another process of the technology described in this specification.

The transceiver unit 402 is used by the communication apparatus 400 to communicate with another module, and may be a circuit, a component, an interface, a bus, a software module, a transceiver, or any other apparatus that can implement communication.

The transceiver unit 402 may be configured to perform step S320 in the embodiment shown in FIG. 3, and/or support another process of the technology described in this specification.

All related content of the steps in the foregoing method embodiments may be cited in function description of corresponding function modules. Details are not described herein again.

Figure 5:
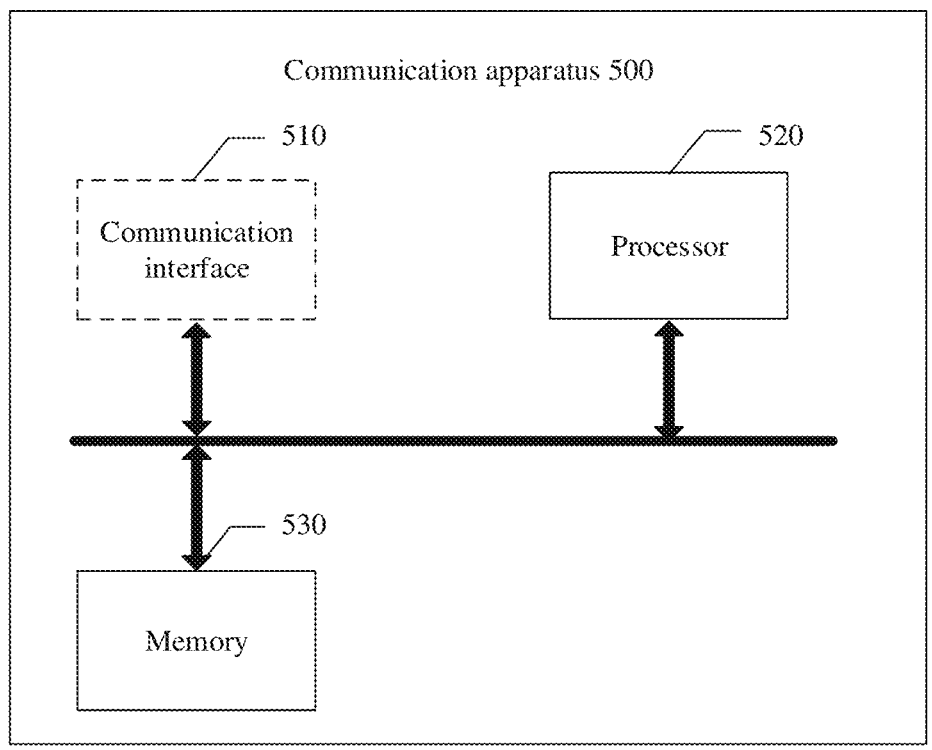
FIG. 5 is a schematic diagram of a communication apparatus according to an embodiment of this application.

FIG. 5 shows a communication apparatus 500 provided in an embodiment of this application. The communication apparatus 500 may be a first terminal apparatus, and can implement a function of the first terminal apparatus in the method provided in the embodiments of this application. The communication apparatus 500 may be an apparatus that can support implementation of a function corresponding to the first terminal apparatus in the method provided in the embodiments of this application. The communication apparatus 500 may be a chip system. In embodiments of this application, the chip system may include a chip, or may include a chip and another discrete component.

In hardware implementation, the transceiver unit 402 may be a transceiver, and the transceiver is integrated into the communication apparatus 500 to form a communication interface 510.

The communication apparatus 500 includes at least one processor 520, configured to implement or support the apparatus 500 in implementing the function of the first terminal apparatus in the method provided in the embodiments of this application. For example, the processor 520 may be configured to determine a reception capability parameter and/or a transmission capability parameter based on a first parameter, where the reception capability parameter includes a quantity of channels that can be received in a first time interval, and/or a maximum quantity of received bits, the transmission capability parameter includes a maximum quantity of transmitted bits, and the first parameter is preconfigured, or the first parameter is configured by a network device, where the first parameter is used for sidelink transmission, and the first parameter includes one or more of the following: a maximum interval between slots of initial transmission and last retransmission, a subcarrier spacing, and a sub-band size. For details, refer to detailed descriptions in the method examples. Details are not described herein again.

The communication apparatus 500 may further include at least one memory 530, configured to store program instructions and/or data. The memory 530 is coupled to the processor 520. Coupling in this embodiment of this application is an indirect coupling or a communication connection between apparatuses, units, or modules, may be in an electrical, a mechanical, or another form, and is used for information exchange between the apparatuses, the units, or the modules. The processor 520 may cooperate with the memory 530. The processor 520 may execute the program instructions stored in the memory 530. At least one of the at least one memory may be included in the processor.

The communication apparatus 500 may further include a communication interface 510, configured to communicate with another device by using a transmission medium, so that an apparatus in the apparatus 500 can communicate with the another device.

The processor 520 may receive/send data through the communication interface 510. The communication interface 510 may be specifically a transceiver.

In this embodiment of this application, a specific medium for connecting the communication interface 510, the processor 520, and the memory 530 is not limited. In this embodiment of this application, the memory 530, the processor 520, and the communication interface 510 are connected to each other in FIG. 5. In FIG. 5, a bus is indicated by using a bold line. A manner of connection between other components is only an example for description, and imposes no limitation. The bus may be classified into an address bus, a data bus, a control bus, and the like. For ease of representation, only one thick line is used to represent the bus in FIG. 5, but this does not mean that there is only one bus or only one type of bus.

In embodiments of this application, the processor 520 may be a general-purpose processor, a digital signal processor, an application-specific integrated circuit, a field programmable gate array or another programmable logic device, a discrete gate or a transistor logic device, a discrete hardware component, or the like, and may implement or perform the methods, steps, and the logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware and software modules in the processor.

In this embodiment of this application, the memory 530 may be a non-volatile memory, such as a hard disk drive (HDD) or a solid-state drive (SSD), or may be a volatile memory such as a random-access memory (RAM). The memory is any other medium that can be configured to carry or store expected program code in a form of instructions or a data structure and that can be accessed by a computer, but is not limited thereto. The memory in embodiments of this application may alternatively be a circuit or any other apparatus that can implement a storage function, and is configured to store program instructions and/or data.

It should be noted that the communication apparatus in the foregoing embodiments may be a terminal, may be a circuit, may be a chip applied to a terminal, or may be another combination device or component that has a function of the terminal. When the apparatus is the terminal, the transceiver unit may be a transceiver, which may include an antenna, a radio frequency circuit, and the like. The processing module may be a processor, for example, a central processing unit (CPU). When the apparatus is a component that has a function of the terminal, the transceiver unit may be a radio frequency unit, and the processing module may be a processor. When the apparatus is a chip system, the transceiver unit may be an input/output interface of the chip system, and the processing module may be a processor of the chip system.

Figure 6:
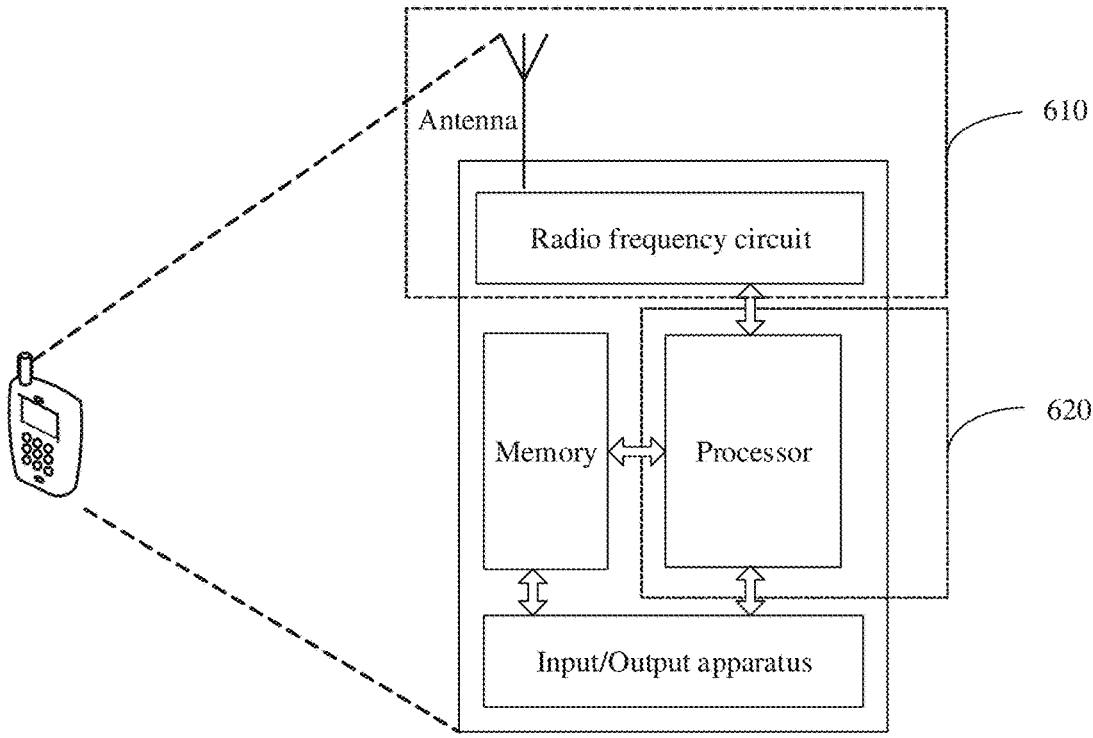
FIG. 6 is a schematic diagram of a communication apparatus according to an embodiment of this application.

FIG. 6 is a simplified schematic diagram of a structure of a communication apparatus. For ease of understanding and illustration, in FIG. 6, a mobile phone is used as an example of the communication apparatus. As shown in FIG. 6, the communication apparatus includes a processor, a memory, a radio frequency circuit, an antenna, and an input/output apparatus. The processor is mainly configured to: process a communication protocol and communication data, and control the communication apparatus to execute a software program, process data of the software program, and the like. The memory is configured to store the software program and the data. The radio frequency circuit is mainly configured to perform conversion between a baseband signal and a radio frequency signal, and process the radio frequency signal. The antenna is mainly configured to send and receive a radio frequency signal in a form of electromagnetic wave. The input/output apparatus, for example, a touchscreen, a display, or a keyboard, is mainly configured to receive data entered by a user and output data to the user. It should be noted that some communication apparatuses may not have the input/output apparatus.

When data needs to be sent, the processor performs baseband processing on to-be-sent data, and outputs a baseband signal to the radio frequency circuit. The radio frequency circuit performs radio frequency processing on the baseband signal and then sends a radio frequency signal to the outside in a form of electromagnetic wave through the antenna. When data is sent to the communication apparatus, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 6 shows only one memory and one processor. In an actual communication apparatus product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna having receiving and sending functions and the radio frequency circuit may be considered as a transceiver unit of the communication apparatus, and the processor having a processing function may be considered as a processing unit of the communication apparatus. As shown in FIG. 6, the communication apparatus includes a transceiver unit 610 and a processing unit 620. The transceiver unit may also be referred to as a transceiver, a transceiver machine, a transceiver apparatus, or the like. The processing unit may also be referred to as a processor, a processing board, a processing module, a processing apparatus, and the like. Optionally, a component that is in the transceiver unit 610 and that is configured to implement a receiving function may be considered as a receiving unit, and a component that is in the transceiver unit 610 and that is configured to implement a sending function may be considered as a sending unit. In other words, the transceiver unit 610 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 610 is configured to perform the sending operation and the receiving operation on the communication apparatus side in the foregoing method embodiments, and the processing unit 620 is configured to perform an operation other than the receiving/sending operation of the communication apparatus in the foregoing method embodiments.

For example, in an implementation, the transceiver unit 610 may be configured to perform step S320 in the embodiment shown in FIG. 3, and/or support another process of the technology described in this specification. The processing unit 620 is configured to perform step S310 in the embodiment shown in FIG. 3, and/or configured to support another process of the technology described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 7:
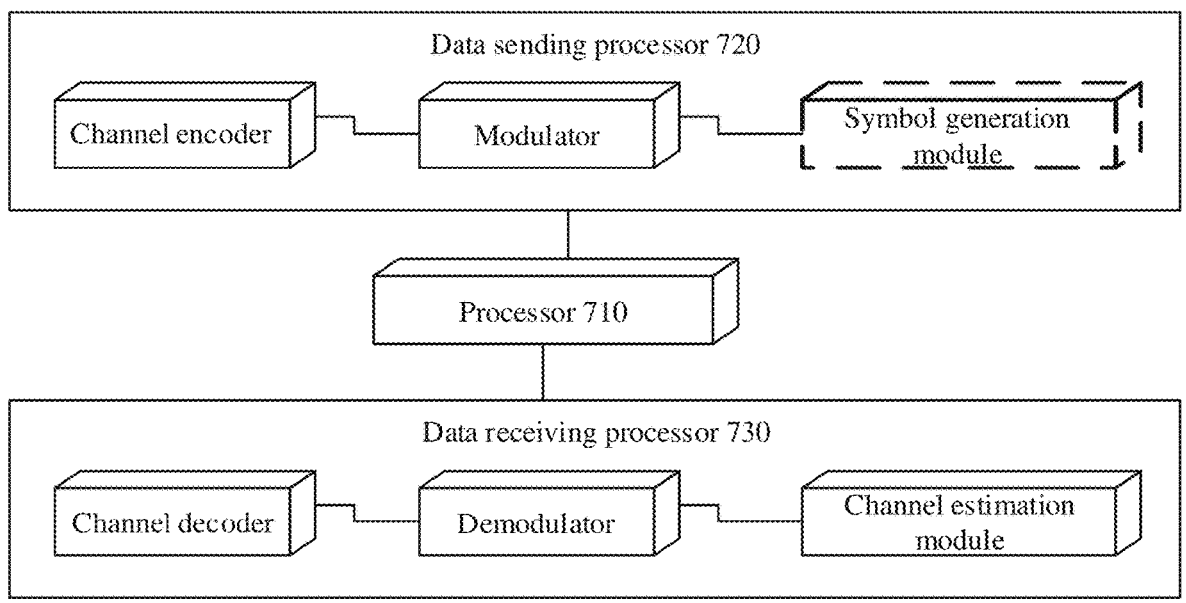
FIG. 7 is a schematic diagram of a communication apparatus according to an embodiment of this application.

In the embodiments, references may be made to a device shown in FIG. 7. In an example, the device may complete a function similar to that of the processing unit 520 in FIG. 5. In FIG. 7, the device includes a processor 710, a data sending processor 720, and a data receiving processor 630. The processing unit 401 in the foregoing embodiment may be the processor 710 in FIG. 7, and completes a corresponding function. The transceiver unit 402 in the foregoing embodiment may be the data sending processor 720 and/or the data receiving processor 730 in FIG. 7. Although FIG. 7 shows a channel encoder, a channel decoder, a modulator, a demodulator, and the like, it may be understood that these modules are merely examples, and do not constitute a limitation on this embodiment.

Figure 8:
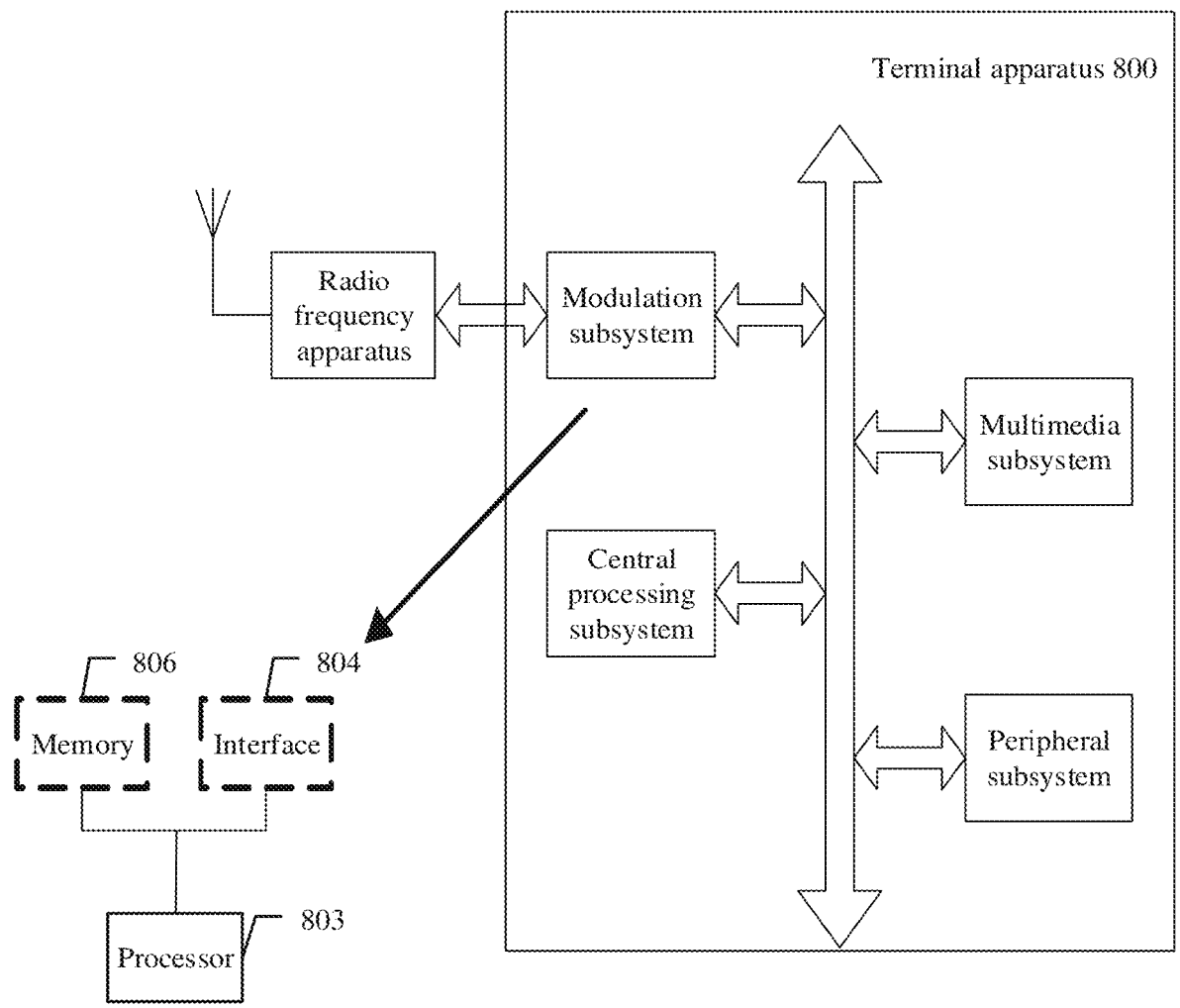
FIG. 8 is a schematic diagram of a communication apparatus according to an embodiment of this application.

FIG. 8 shows another form of the embodiments. A terminal apparatus 800 includes modules such as a modulation subsystem, a central processing subsystem, and a peripheral subsystem. The first terminal apparatus in the embodiments may be used as the modulation subsystem in the terminal apparatus. Specifically, the modulation subsystem may include a processor 803 and an interface 804. The processor 803 completes a function of the processing unit 401, and the interface 804 completes a function of the transceiver unit 402. In another variation, the modulation subsystem includes a memory 806, the processor 803, and a program that is stored in the memory 806 and that can be run on the processor. When executing the program, the processor 803 implements the method of the first terminal apparatus or the second terminal apparatus in the foregoing method embodiments. It should be noted that the memory 806 may be non-volatile or volatile. The memory 806 may be located in the modulation subsystem, or may be located in the processing apparatus 800, provided that the memory 806 can be connected to the processor 803.

An embodiment of this application further provides a computer-readable storage medium including instructions. When the instructions are run on a computer, the computer is enabled to perform the method performed by the first terminal apparatus in FIG. 3.

An embodiment of this application further provides a computer program product including instructions. When the computer program product is run on a computer, the computer is enabled to perform the method performed by the first terminal apparatus in FIG. 3.

An embodiment of this application provides a chip system. The chip system includes a processor, may further include a memory, and is configured to implement functions of the first device in the foregoing method. The chip system may include a chip, or may include a chip and another discrete device.

All or some of the methods in the embodiments of this application may be implemented by using software, hardware, firmware, or any combination thereof. When the software is used for implementation, all or some of the embodiments may be implemented in a form of a computer program product. The computer program product includes one or more computer instructions. When computer program instructions are loaded and executed on a computer, the procedures or the functions according to the embodiments of the present application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD), a semiconductor medium (for example, an SSD), or the like.

It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method comprising:
   determining, by a first terminal apparatus, at least one of a reception capability parameter or a transmission capability parameter based on a first parameter,
   wherein the reception capability parameter comprises a quantity of channels receivable in a first time interval, the transmission capability parameter comprising a maximum quantity of transmitted bits and the first parameter being configured by a network device, and
   wherein the first parameter comprises one or more of the following: a maximum interval between slots of an initial transmission and a last retransmission, a subcarrier spacing, or a sub-band size; and
   performing, by the first terminal apparatus, sidelink transmission based on at least one of the reception capability parameter or the transmission capability parameter.

2. The method according to claim 1, wherein the quantity of channels receivable in the first time interval comprises:
   a quantity of control channels receivable in the first time interval; or
   at least one of a quantity of first-level control channels receivable in the first time interval or a quantity of second-level control channels receivable in the first time interval.

3. The method according to claim 1,
   wherein the first time interval is a slot, or
   wherein the first time interval is less than or equal to an interval between the initial transmission and the last retransmission of a data packet.

4. The method according to claim 1,
   wherein the quantity of channels receivable in the first time interval belongs to at least one type of quantity of channels receivable in the first time interval, and
   wherein the subcarrier spacing belongs to at least one type of subcarrier spacing, the at least one type of quantity of channels receivable in the first time interval being in a one-to-one correspondence with the at least one type of subcarrier spacing, and a larger subcarrier spacing indicating a smaller quantity that is of channels receivable in the first time interval and that corresponds to the subcarrier spacing, or
   wherein an interval between the slots of the initial transmission and the last retransmission belongs to at least one type of interval between the slots of the initial transmission and the last retransmission, the at least one type of quantity of channels receivable in the first time interval being in a one-to-one correspondence with the at least one type of interval between the slots of the initial transmission and the last retransmission, and a larger interval between the slots of the initial transmission and the last retransmission indicating a larger quantity that is of channels receivable in the first time interval and that corresponds to the interval between the slots of the initial transmission and the last retransmission, or
   wherein the sub-band size belongs to at least one type of sub-band size, the at least one type of quantity of channels receivable in the first time interval being in a one-to-one correspondence with the at least one type of sub-band size, and a larger sub-band size indicating a smaller quantity that is of channels receivable in the first time interval and that corresponds to the sub-band size.

5. The method according to claim 1, wherein the first parameter further comprises one or more of the following: a reception type class, a bandwidth size, a carrier quantity or a carrier combination, or a spatial layer quantity.

6. The method according to claim 5,
   wherein the quantity of channels receivable in the first time interval belongs to at least one type of quantity of channels receivable in the first time interval, and
   wherein the reception type class belongs to at least one type of reception type class, the at least one type of quantity of channels receivable in the first time interval being in a one-to-one correspondence with the at least one type of reception type class, and a higher reception type class indicating a larger quantity that is of channels receivable in the first time interval and that corresponds to the reception type class, or
   wherein the bandwidth size belongs to at least one type of bandwidth size, the at least one type of quantity of channels receivable in the first time interval being in a one-to-one correspondence with the at least one type of bandwidth size, and a larger bandwidth size indicating a larger quantity that is of channels receivable in the first time interval and that corresponds to the bandwidth size, or
   wherein the carrier quantity belongs to at least one type of carrier quantity, the at least one type of quantity of channels receivable in the first time interval being in a one-to-one correspondence with the at least one type of carrier quantity, and a larger carrier quantity indicating a larger quantity that is of channels receivable in the first time interval and that corresponds to the carrier quantity, or
   wherein the carrier combination belongs to at least one type of carrier combination, the at least one type of quantity of channels receivable in the first time interval being in a one-to-one correspondence with the at least one type of carrier combination, and a larger total bandwidth of the carrier combination indicating a larger quantity that is of channels receivable in the first time interval and that corresponds to the carrier combination, or
   wherein the spatial layer quantity belongs to at least one type of spatial layer quantity, the at least one type of quantity of channels receivable in the first time interval being in a one-to-one correspondence with the at least one type of spatial layer quantity, and a larger spatial layer quantity indicating a larger quantity that is of channels receivable in the first time interval and that corresponds to the spatial layer quantity.

7. The method according to claim 1, wherein determining the reception capability parameter based on the first parameter comprises:
   in case of 20 MHz bandwidth, the subcarrier spacing is 15 kHz, determining that the quantity of channels that can be received in the first time interval is 10 or 20,
   in case of 20 MHz bandwidth, the subcarrier spacing is 30 kHz, determining that the quantity of channels that can be received in the first time interval is 6 or 12, or
   in case of 20 MHz bandwidth, the subcarrier spacing is 60 kHz, determining that the quantity of channels that can be received in the first time interval is 2 or 6.

8. A communication apparatus comprising:
   at least one processor; and
   one or more memories coupled to the at least one processor and storing programming instructions for execution by the at least one processor, cause the apparatus to:

determine at least one of a reception capability parameter or a transmission capability parameter based on a first parameter, wherein the reception capability parameter comprises a quantity of channels receivable in a first time interval, the transmission capability parameter comprising a maximum quantity of transmitted bits and the first parameter being configured by a network device, and wherein the first parameter comprises one or more of the following: a maximum interval between slots of an initial transmission and a last retransmission, a subcarrier spacing, or a sub-band size; and perform sidelink transmission based on at least one of the reception capability parameter or the transmission capability parameter.

9. The apparatus according to claim 8, wherein the quantity of channels receivable in the first time interval comprises:

a quantity of control channels receivable in the first time interval, or at least one of a quantity of first-level control channels receivable in the first time interval or a quantity of second-level control channels receivable in the first time interval.

10. The apparatus according to claim 8, wherein the first time interval is one slot, or wherein the first time interval is less than or equal to an interval between the initial transmission and the last retransmission of one data packet.

11. The apparatus according to claim 8, wherein the quantity of channels receivable in the first time interval belongs to at least one type of quantity of channels receivable in the first time interval, and wherein the subcarrier spacing belongs to at least one type of subcarrier spacing, the at least one type of quantity of channels receivable in the first time interval being in a one-to-one correspondence with the at least one type of subcarrier spacing, and a larger subcarrier spacing indicating a smaller quantity that is of channels receivable in the first time interval and that corresponds to the subcarrier spacing, or wherein an interval between the slots of the initial transmission and the last retransmission belongs to at least one type of interval between the slots of the initial transmission and the last retransmission, the at least one type of quantity of channels receivable in the first time interval being in a one-to-one correspondence with the at least one type of interval between the slots of the initial transmission and the last retransmission, and a larger interval between the slots of the initial transmission and the last retransmission indicating a larger quantity that is of channels receivable in the first time interval and that corresponds to the interval between the slots of the initial transmission and the last retransmission, or wherein the sub-band size belongs to at least one type of sub-band size, the at least one type of quantity of channels receivable in the first time interval being in a one-to-one correspondence with the at least one type of sub-band size, and a larger sub-band size indicating a smaller quantity that is of channels receivable in the first time interval and that corresponds to the sub-band size.

12. The apparatus according to claim 8, wherein the first parameter further comprises one or more of the following a reception type class, a bandwidth size, a carrier quantity or a carrier combination, or a spatial layer quantity.

13. The apparatus according to claim 12, wherein the quantity of channels receivable in the first time interval belongs to at least one type of quantity of channels receivable in the first time interval, and wherein the reception type class belongs to at least one type of reception type class, the at least one type of quantity of channels receivable in the first time interval being in a one-to-one correspondence with the at least one type of reception type class, and a higher reception type class indicating a larger quantity that is of channels receivable in the first time interval and that corresponds to the reception type class, or wherein the bandwidth size belongs to at least one type of bandwidth size, the at least one type of quantity of channels receivable in the first time interval being in a one-to-one correspondence with the at least one type of bandwidth size, and a larger bandwidth size indicating a larger quantity that is of channels receivable in the first time interval and that corresponds to the bandwidth size, or wherein the carrier quantity belongs to at least one type of carrier quantity, the at least one type of quantity of channels receivable in the first time interval being in a one-to-one correspondence with the at least one type of carrier quantity, and a larger carrier quantity indicating a larger quantity that is of channels receivable in the first time interval and that corresponds to the carrier quantity, or wherein the carrier combination belongs to at least one type of carrier combination, the at least one type of quantity of channels receivable in the first time interval being in a one-to-one correspondence with the at least one type of carrier combination, and a larger total bandwidth of the carrier combination indicating a larger quantity that is of channels receivable in the first time interval and that corresponds to the carrier combination, or wherein the spatial layer quantity belongs to at least one type of spatial layer quantity, the at least one type of quantity of channels receivable in the first time interval being in a one-to-one correspondence with the at least one type of spatial layer quantity, and a larger spatial layer quantity indicating a larger quantity that is of channels receivable in the first time interval and that corresponds to the spatial layer quantity.

14. The apparatus according to claim 8, wherein to determine the reception capability parameter based on the first parameter comprises:

in case of 20 MHz bandwidth, the subcarrier spacing is 15 kHz, determine that the quantity of channels that can be received in the first time interval is 10 or 20, in case of 20 MHz bandwidth, the subcarrier spacing is 30 kHz, determine that the quantity of channels that can be received in the first time interval is 6 or 12, or in case of 20 MHz bandwidth, the subcarrier spacing is 60 kHz, determine that the quantity of channels that can be received in the first time interval is 2 or 6.

15. A non-transitory computer-readable storage medium comprising executable instructions, wherein the executable instructions, when executed by a computer, cause the computer to:

determine at least one of a reception capability parameter or a transmission capability parameter based on a first parameter, wherein the reception capability parameter comprises a quantity of channels received receivable in a first time interval, the transmission capability parameter comprising a maximum quantity of transmitted bits and the first parameter being configured by a network device, and wherein the first parameter comprises one or more of the following: a maximum interval between slots of an initial transmission and a last retransmission, a subcarrier spacing, or a sub-band size; and perform sidelink transmission based on at least one of the reception capability parameter or the transmission capability parameter.

16. The non-transitory computer-readable storage medium according to claim 15, wherein the quantity of channels receivable in the first time interval comprises:
   a quantity of control channels that can be received in the first time interval, or
   at least one of a quantity of first-level control channels that can be received in the first time interval or a quantity of second-level control channels that can be received in the first time interval.

17. The non-transitory computer-readable storage medium according to claim 15, wherein the first time interval is one slot or is less than or equal to an interval between the initial transmission and the last retransmission of one data packet.

18. The non-transitory computer-readable storage medium according to claim 15,
   wherein the quantity of channels that can be received in the first time interval belongs to at least one type of quantity of channels that can be received in the first time interval; and
   wherein the subcarrier spacing belongs to at least one type of subcarrier spacing, the at least one type of quantity of channels receivable in the first time interval being in a one-to-one correspondence with the at least one type of subcarrier spacing, and a larger subcarrier spacing indicating a smaller quantity that is of channels receivable in the first time interval and that corresponds to the subcarrier spacing, or
   wherein an interval between the slots of the initial transmission and the last retransmission belongs to at least one type of interval between the slots of the initial transmission and the last retransmission, the at least one type of quantity of channels receivable in the first time interval being in a one-to-one correspondence with the at least one type of interval between the slots of the initial transmission and the last retransmission, and a larger interval between the slots of the initial transmission and the last retransmission indicating a larger quantity that is of channels receivable in the first time interval and that corresponds to the interval between the slots of the initial transmission and the last retransmission, or
   wherein the sub-band size belongs to at least one type of sub-band size, the at least one type of quantity of channels receivable in the first time interval being in a one-to-one correspondence with the at least one type of sub-band size, and a larger sub-band size indicating a smaller quantity that is of channels receivable in the first time interval and that corresponds to the sub-band size.

19. The non-transitory computer-readable storage medium according to claim 15, wherein the first parameter further comprises one or more of the following a reception type class, a bandwidth size, a carrier quantity or a carrier combination, or a spatial layer quantity.

20. The non-transitory computer-readable storage medium according to claim 15, wherein to determine the reception capability parameter based on the first parameter comprises:
   in case of 20 MHz bandwidth, the subcarrier spacing is 15 kHz, determine that the quantity of channels that can be received in the first time interval is 10 or 20,
   in case of 20 MHz bandwidth, the subcarrier spacing is 30 kHz, determine that the quantity of channels that can be received in the first time interval is 6 or 12, or
   in case of 20 MHz bandwidth, the subcarrier spacing is 60 kHz, determine that the quantity of channels that can be received in the first time interval is 2 or 6.

* * * * *

UNITED STATES PATENT AND TRADEMARK OFFICE
CERTIFICATE OF CORRECTION

| | | |
|---|---|---|
| PATENT NO. | : 12,101,650 B2 | |
| APPLICATION NO. | : 17/721120 | |
| DATED | : September 24, 2024 | |
| INVENTOR(S) | : Li et al. | |

It is certified that error appears in the above-identified patent and that said Letters Patent is hereby corrected as shown below:

In the Claims

In Column 61, in Claim 15, Line 2, after "channels" delete "received".

Signed and Sealed this
Twenty-ninth Day of October, 2024

*Katherine Kelly Vidal*

Katherine Kelly Vidal
*Director of the United States Patent and Trademark Office*